(12) United States Patent
Bliss

(10) Patent No.: US 12,490,743 B2
(45) Date of Patent: Dec. 9, 2025

(54) METHOD FOR TREATMENT OF CROPS

(71) Applicant: Wobelea PTY LTD, Pakenham (AU)

(72) Inventor: Sarah Bliss, Koo Wee Rup (AU)

(73) Assignee: Wobelea PTY LTD, Pakenham (AU)

( * ) Notice: Subject to any disclaimer, the term of this patent is extended or adjusted under 35 U.S.C. 154(b) by 725 days.

(21) Appl. No.: 17/634,187

(22) PCT Filed: Aug. 14, 2020

(86) PCT No.: PCT/AU2020/050850
§ 371 (c)(1),
(2) Date: Feb. 9, 2022

(87) PCT Pub. No.: WO2021/026615
PCT Pub. Date: Feb. 18, 2021

(65) Prior Publication Data
US 2022/0361504 A1     Nov. 17, 2022

(30) Foreign Application Priority Data
Aug. 14, 2019   (AU) .............................. 2019902943

(51) Int. Cl.
| | | |
|---|---|---|
| *A01N 59/02* | (2006.01) | |
| *A01N 25/12* | (2006.01) | |
| *A01N 25/30* | (2006.01) | |
| *A01N 37/10* | (2006.01) | |
| *A01P 1/00* | (2006.01) | |
| *A01P 3/00* | (2006.01) | |

(52) U.S. Cl.
CPC .............. *A01N 59/02* (2013.01); *A01N 25/12* (2013.01); *A01N 25/30* (2013.01); *A01N 37/10* (2013.01); *A01P 1/00* (2021.08); *A01P 3/00* (2021.08)

(58) Field of Classification Search
None
See application file for complete search history.

(56) References Cited

U.S. PATENT DOCUMENTS 5,057,326 A * 10/1991 Sampson ............... A23B 7/157
                                                              424/711
2004/0167220 A1   8/2004 Horst et al.
2012/0277276 A1   11/2012 Bliss

FOREIGN PATENT DOCUMENTS

WO   WO-2009135252 A1 * 11/2009 ............. A01N 37/10

OTHER PUBLICATIONS

Turkkan, M., Evaluation of Inhibitory Effect of Organic and Inorganic Salts Against Ilyonectria liriodendri, The Causal Agent of Root Rot Disease of Kiwifruit, J Phytopathol 163 (2015) 567-577 (Year: 2015).*
Beery, K.E. & Ladisch, M.R., Chemistry and properties of starch based desiccants, Enzyme and Microbiol Tech. 28 (2001) 573-81 ( Year: 2001).*
Beery, K. et al. "Chemistry and Properties of starch based desiccants", Enzyme and Microbial Technology, 2001, pp. 573-581, vol. 28, Nos. 7-8.
Bliss, W.R.D. "Post Harvest Treatment of Produce", Australasian Postharvest Horticulture Conference, Science and technology for the fresh food revolution, Melbourne, Australia, Sep. 18-22, 1995, pp. 387-392.

* cited by examiner

*Primary Examiner* — H. Sarah Park
(74) *Attorney, Agent, or Firm* — Anderson Patent Law Firm

(57) ABSTRACT

The present invention provides a method for treating crops in field or in a processing facility comprising the steps of producing a dry composition comprising a metabisulphite, a benzoate salt and a cellulose additive; preparing said dry composition as a formulation; and applying the formulation to a crop, wherein said treatment is for prevention or reduction of crop damage by plant pathogens, or reduction of bacterial, fungal or human pathogens.

23 Claims, 17 Drawing Sheets

METHOD FOR TREATMENT OF CROPS

FIELD OF THE INVENTION

The present invention relates to a method of the treatment of crops and more particularly a method for preparing and applying a formulation, preferably in the form of a spray to the growing crop, for control of pathogen growth and to provide crop protection from pathogenic attack. The formulation may also be applied as a fruit and vegetable wash to remove harmful pathogens from surface of produce and extend shelf life and safety of the packed or stored produce as a post harvest application.

BACKGROUND OF THE INVENTION

Pathogen infections can result in significant losses to agricultural crops caused by pre-harvest damage, killing them outright or weakening them so as to decrease yields and render the plants, fruit or grains susceptible to primary and secondary infections. Post-harvest infections also results in significant loss of agricultural products during storage, processing and handling.

When fruit, vegetables and grains are to be eaten or processed it is essential that any treatment given to them does not lead to residues which exceed safe limits. Significant variation in allowable residues may exist between local and overseas markets.

Many pathogen treatments may produce residues, although very small, leave the treated product in breach of the law of the country to which it has been exported. Further, some current treatments also result in harm to select beneficial microorganisms present on the surface of the crop.

Further, some pathogen strains are found to have developed separate mechanisms of resistance to two or more unrelated fungicides and is termed 'multiple resistance'. For example, strains of *Botrytis cinerea* are known to have become resistant to both benzimidazole and dicarboximide fungicides.

Despite a number of chemical agents having been developed for treating crops, there remains a need for the development of further methods of treatment, in particular in the development of bacteriacide and disinfectant control agents which are highly toxic to harmful pathogens yet safe for humans, crops and/or animals.

There exists a need to overcome, or at least alleviate, one or more of the difficulties or deficiencies associated with the prior art.

SUMMARY OF THE INVENTION

According to the invention there is provided a method of treating crops, including fruit, vegetables and grain, to provide protection against selected pathogens. There is further provided a method of treating crops, including fruit, vegetables and grain, to control pathogen growth. The pathogens may include plant pathogens, as well as bacterial, fungal and human pathogens.

In one aspect, the present invention provides a method for treating crops comprising the steps of:

producing a dry composition comprising;
- a metabisulphite,
- a benzoate salt, and
- a cellulose additive;

preparing said dry composition as a formulation; and applying the prepared formulation to a crop, wherein said treatment is for prevention or reduction of crop damage by plant pathogens, or to reduce bacterial, fungal or human pathogens on said crop.

In a second aspect, the present invention provides a method for treating crops comprising the steps of:

providing a dry composition comprising:
- a metabisulphite,
- a benzoate salt, and
- a cellulose additive;

preparing said dry composition as a formulation;

applying the crop with a fungicide; and applying the formulation to the crop, wherein said treatment is for prevention or reduction of crop damage by plant pathogens or to reduce bacterial, fungal or human pathogens on said crop.

DETAILED DESCRIPTION

By a 'dry composition' as used herein is meant a mixture of components in a form substantially free of moisture. For example, the dry composition may be in powder or any other suitable physical form. A dry composition according to the invention may be presented in unit dosage form, for example in a sachet.

By 'plant pathogen' as used herein is meant an organism which is capable of causing harm or disease to a crop, wherein the plant pathogen may include pathogens which are also capable of causing harm or disease to a humans or animals.

In a preferred embodiment the metabisulphite is selected from any suitable metabisulphite salt. In a particularly preferred embodiment the metabisulphite salt is a sodium metabisulphite. In an alternatively preferred embodiment the metabisulphite salt is a potassium metabisulphite.

Preferably, the metabisulphite is in the physical form of a powder.

In a preferred embodiment, the benzoate salt is selected from any suitable benzoate salt. In a particularly preferred embodiment the benzoate salt is a sodium benzoate. In an alternative embodiment the benzoate is a potassium benzoate.

Preferably, the benzoate salt is in the physical form of a powder.

In a preferred embodiment, the dry composition comprises sodium metabisulphite blended with sodium benzoate at a ratio of approximately between 20:80 and 30:70 w/w, together with a cellulose additive. In a particularly preferred embodiment the dry composition comprises sodium metabisulphite blended with sodium benzoate at a ratio of approximately between 22:78 and 29:71 w/w, together with a cellulose additive.

In a preferred embodiment, the dry composition includes a cellulose additive at approximately between 0.5 to 3% by weight of the dry composition. In a further preferred embodiment the dry composition includes a cellulose additive at approximately between 0.8 to 2.0% by weight of the dry composition. In a further preferred embodiment the dry composition comprises a cellulose additive at approximately between 1.0 to 1.5% by weight of the dry composition.

By 'formulation' as used herein is meant a mixture comprising the 'dry composition' being further blended with a surfactant, additional additive or solution.

By 'blended' as used herein is meant any suitable form of mixing to form a substantially evenly distributed formulation. Preferably, the blending technique includes any method of mechanical or hand mixing, or any other suitable form of agitation to achieve a substantially evenly distributed formulation.

In a preferred embodiment the blending may be performed by a V blender, double blender, bin blender, drum blender, paddle blender, cement or concrete mixers, twin shaft mixers, or any other suitable blender or mixer.

By a 'cellulose additive' as used herein is meant any additional component containing cellulose. For example, the cellulose additive may be selected from alpha cellulose, cellulose, cellulose crystalline; cellulose gel, hydroxycellulose, microcrystalline cellulose, plastics, cellulosic, and sulfite cellulose.

In a preferred embodiment the cellulose additive is CAS #9000-34-6.

In a preferred embodiment the formulation comprises a dry composition being further blended with a surfactant, other suitable additive or solution. In a particularly preferred embodiment the formulation comprises a dry composition being further blended with a surfactant at a ratio of approximately between 0.5% to 10% w/w. of the final formulation. In a particularly preferred embodiment the formulation comprises a dry composition being further blended with a surfactant at a ratio of approximately between 0.8% to 8% w/w of the final formulation. In a particularly preferred embodiment the formulation comprises a dry composition being further blended with a surfactant at a ratio of approximately between 1.0% to 6% w/w of the final formulation.

The surfactant (otherwise referred to as wetting agents) optionally used in the present invention is selected from any suitable surfactant, said surfactant being suitable for human and/or animal consumption. Preferably the surfactant is selected from a non-ionic surfactant and an ionic surfactant.

By a 'non-ionic surfactant' as used herein is meant an organic compound containing covalently bonded oxygen-containing hydrophilic groups, bound to hydrophobic parent structures.

By an 'ionic surfactant' as used herein is meant a chemical compound containing a positively and/or negatively charged, polar functional ground bound to a hydrophobic parent structure. Ionic surfactants include anionic, cationic and zwitterionic molecules.

Preferably the surfactant is selected from polyethylene glycol, polyethylene oxide, dipropylene glycol and polysorbate 80.

By a 'polyethylene glycol' as used herein is meant a polyether organic compound preferably having a molecular weight less than 100,000 g/mol. By a 'polyethylene oxide' as used herein, is meant a polymer preferably having a molecular weight equal to or greater than 100,000 g/mol.

By an 'organic compound' is meant a chemical compound, the molecules of which contain the element carbon. In a preferred embodiment, the organic compound may be a hydrocarbon. By a 'hydrocarbon' is meant an organic compound containing, inter alia, the elements carbon and hydrogen.

In a preferred embodiment, the dry composition is capable of being stored for approximately up to 24 months prior to further blending/formulation or being administered to crops.

In a preferred embodiment the formulation may be diluted to produce a solution, prior to being administered to crops. In a further preferred embodiment the formulation may be diluted with an aqueous mixture to produce a solution. In a particularly preferred embodiment the formulation may be diluted with water to produce a solution used to wash crops.

The aqueous mixture may be of any suitable type. By "aqueous mixture" as used herein is meant a water based solvent or a solvent including at least approximately 50% water. In a preferred embodiment, the aqueous mixture is water.

Preferably the formulation is diluted with a solution no earlier than approximately 14 days prior to being administered the crops.

In a preferred embodiment, the solution has a pH of between approximately 2.0 to 7.5. In a further preferred embodiment, the solution has a pH of between approximately 3.0 to 6.5. In a particularly preferred embodiment, the solution has a pH of between approximately 4.0 and 6.0.

Preferably the solution is applied to a crop as either a pre-harvest spray or a post harvest wash. In a particularly preferred embodiment the solution is applied to the crop as a pre-harvest spray.

By 'a crop' as used herein is meant any food product suitable for human or animal consumption, or a tree, vine or other plant upon which the food product is grown. In a preferred embodiment the crop includes fruits, vegetables, grains, grasses and seeds.

In a particularly preferred embodiment the crop includes grapes and other fruit, vegetables or grains suitable for the production of wine or other beverages. In a further preferred embodiment the crop includes berries, stone fruits, citrus fruits, tropical fruits, melons, drupes, pomes or any other edible fruit. In a further preferred embodiment the crop includes tropical vegetables, bulb vegetables, *brassica* vegetables, fruiting vegetables, leafy vegetables, legumes, pulses, root and tuber vegetables, stalk and stem vegetables, cereal grains, tree nuts and herbs, including lettuce, garlic and pistachios. In a further preferred embodiment the crop includes seeds and seedlings of flowering crops, fruits and vegetables.

In a particularly preferred embodiment the crop to be treated is selected from apples, pears, cherries or grapes.

In an embodiment, the solution is applied to a crop upon expression of pathogens or at any combination of the following stages of crop maturation:
Bud-swell;
(20% to 30%) bloom and early petal-fall stages;
One month to harvest;
Two weeks to harvest.

In an alternative preferred embodiment, a fungicide is applied between approximately 2 to 12 hours prior to the solution. In a further preferred embodiment the fungicide contains an active ingredient which is applied at a rate of between approximately 5 to 25 ppm.

In a more preferred embodiment, the grape vine varieties may be selected from the group consisting of *Vitis Vinifera, Vitis labrusca, Vitis riparia, Vitis rotundifolia, Vitis rupestris, Vitis aestivalis, Vitis mustangensis. Vitis coignetiae, Vitis californica, Vitis vulpina, Vitis amurensis, Muscadinia rotundifolia* and *Vitis romanetii*. In a further preferred embodiment the grape vine varieties may be a cultivar or hybrid of any aforementioned species.

In a preferred embodiment, the crop may be a fruit that is susceptible to stem end rots, such as cherries. In this embodiment, the formulation of the present invention may be as a spray pre-harvest to help prevent or reduce stem end rots, and/or used after harvest to prevent or reduce stem end rots.

In a preferred embodiment, the solution is applied at no later than 3 days prior to harvest. In a further preferred embodiment, the solution is further applied upon expression of *botrytis* and at any combination of the following stages of grape maturation:
- approximately 10% flower crop;
- approximately 10% cap fall;
- approximately 30% cap fall;
- approximately end of flowering;
- approximately berry size approximately 4 mm;
- approximately bunch closure; and
- approximately veraison.

In an alternative preferred embodiment, a fungicide is applied between approximately 2 to 12 hours prior to the solution. In a further preferred embodiment the fungicide contains an active ingredient which is applied at a rate of between approximately 5 to 25 ppm.

In a preferred embodiment the applied solution has a concentration of approximately between 1 g/L to 8 g/L. In a further preferred embodiment the applied solution has a concentration of approximately between 2 g/L to 6.5 g/L. In a further preferred embodiment the applied solution has a concentration of approximately between 3.5 g/L to 4.5 g/L. In a further preferred embodiment the applied solution has a concentration of approximately between 3.75 g/L to 4.25 g/L.

In a preferred embodiment the applied solution has a concentration of between approximately 2 g/L and approximately 8 g/L. In a particularly preferred embodiment, the applied solution has a concentration of 2 g/L, 4 g/L or 8 g/L.

In a preferred embodiment the applied solution results in a reduction of growth of crop pathogens. In a preferred embodiment, the applied solution results in a reduction of growth of crop pathogens selected from the group consisting of *Botrytis cinerea, Xanthomonas* spp *E. coli, Monilina fructicola* and *Penicillium* spp. In a further embodiment the applied solution results in a reduction of growth of the crop pathogen *Xanthomonas campestris*. In a further preferred embodiment the applied solution results in reducing growth of the crop pathogen *Erwinia Carotovora*.

Preferably, the applied solution is delivered at a rate between approximately 500-1600 L/Ha. Preferably the applied solution is delivered at a temperature of not more than approximately 30'C. Preferably the applied solution is applied at a humidity of less than approximately 75%.

In a preferred embodiment the applied solution may be applied at the above rates and delivery conditions for all growing crops described herein, from seedling through to harvest.

In a preferred embodiment use of the applied solution results in very low levels of residue of sulphites and the benzoates in the resulting crop and products thereof. These levels may be well below the limits for food safety standards.

For example, when the solution of the present invention is used on grape vines, as hereinbefore described, sulphite residue in the resulting wine, juice or pomace may be less than approximately 100 mg/L, more preferably less than 10 mg/L, more preferably between approximately 3 and 5 mg/L. In Australia, the maximum permitted levels of sulphites in wines varies from 200 to 300 mg/kg depending on the type of wine and residual sugar level.

For example, when the solution of the present invention is used on grape vines, as hereinbefore described, benzoate residue in the resulting wine, juice or pomace may be less than approximately 100 mg/L, more preferably less than 50 mg/L, more preferably between approximately 1 and 50 mg/L. In Australia, the maximum permitted level of benzoates in wines is 400 mg/kg.

In a preferred embodiment the applied solution may be used in a run to waste washing facility as a post harvest bacteriacide/disinfectant on produce such as fruit, vegetables and nuts. In this embodiment, capacity may be dosed through automatic control, preferably at rates of approximately 2 g/L or 4 g/L. Preferably the contact time is not less than approximately 2 minutes and not more than approximately 60 minutes.

In a preferred embodiment the applied solution may be used in a recirculating washing facility as a post harvest bacteriacide/disinfectant on produce as fruit, vegetables and nuts. In this embodiment, capacity may be dosed through automatic control, preferably at rates of approximately 2 g/L or 4 g/L. Preferably the contact time is not less than approximately 2 minutes and not more than approximately 60 minutes.

In a preferred embodiment, the applied solution may be used in conjunction with a filtration system.

In an alternative preferred embodiment the crop is treated with a solution of the composition, as described herein, post harvest. In a preferred embodiment the solution applied post harvest has a concentration of approximately between 1 g/L to 8 g/L. In a further preferred embodiment the solution applied post harvest has a concentration of approximately between 2 g/L to 6.5 g/L. In a further preferred embodiment the solution applied post harvest has a concentration of approximately between 3.5 g/L to 4.5 g/L. In a further preferred embodiment the solution applied post harvest has a concentration of approximately between 3.75 g/L to 4.25 g/L.

In a preferred embodiment the applied solution results in approximately between 10% to 30% reduction in *Botrytis cinerea* growth compared to an untreated crop. In a further preferred embodiment the applied solution results in approximately between 15 to 25% reduction in *Botrytis cinerea* growth compared to an untreated crop. In a particularly preferred embodiment the applied solution results in approximately between 17% to 23% reduction in *Botrytis cinerea* growth compared to an untreated crop.

In a preferred embodiment, the applied solution results in approximately greater than 50% reduction in *Xanthomonas* sp growth compared to an untreated crop. In a more preferred embodiment, the applied solution results in approximately greater than 75% reduction in *Xanthomonas* sp growth compared to an untreated crop. In a particularly preferred embodiment, the applied solution results in approximately greater than 90% reduction in *Xanthomonas* sp growth compared to an untreated crop.

In a preferred embodiment, the applied solution results in approximately greater than 60% reduction in growth of *E. coli* compared to an untreated crop. In a more preferred embodiment the applied solution results in approximately greater than 70% reduction in growth of *E. coli* compared to an untreated crop. In a particular preferred embodiment the applied solution results in approximately greater than 80% reduction in growth of *E. coli* compared to an untreated crop.

Where this analysis is performed in a laboratory rather than in situ, the untreated crop may be a sample of an untreated crop.

In a further preferred embodiment, the applied solution results in no substantial effect on the growth rate of *Saccharomyces cerevisae* and *Schizosaccharomyces pombe* species.

In an embodiment the fungicide contains a halogen based active ingredient. In a preferred embodiment the halogen based fungicide contains an active ingredient selected from bromochlorodimethylhydantoin (BCDMH), Chlorine, Bromine, an active ingredient which releases a halogen, an active ingredient which releases hypobromous acid and/or hypochlorous acid, an active ingredient which releases chlorine and/or bromine, or a fungicide containing any suitable combination thereof.

By 'bromochlorodimethylhydantoin (BCDMH)' as used herein is meant 1-Bromo-3-chloro-5,5-dimethylhydantoin, 3-Bromo-1-chloro-3-chloro-5,5-dimethylhydantoin or any combination or mixture thereof.

In a preferred embodiment the fungicide is applied as a solution containing the halogen based active ingredient at a concentration of approximately between 1 to 100 ppm. In a further embodiment the fungicide is applied as a solution containing the halogen based active ingredient at a concentration of approximately between 2 to 50 ppm. In a preferred embodiment the fungicide is applied as a solution containing the halogen based active ingredient at a concentration of approximately between 5 to 10 ppm.

In an embodiment the crop is treated with both the formulation and fungicide pre harvest. In a further embodiment the crop is treated with both the formulation and fungicide pre harvest and the crop is further treated with the formulation post harvest. In a further embodiment the crop is treated with both the formulation and fungicide pre harvest and the crop is further treated with both the formulation and fungicide post harvest.

In an alternative embodiment the crop is treated with both the formulation and fungicide post harvest. In an alternative preferred embodiment the crop is treated with both the formulation and fungicide post harvest and the crop is treated with the formulation pre harvest.

The present invention will now be more fully described with reference to the accompanying Examples and drawings. It should be understood, however, that the description following is illustrative only and should not be taken in any way as a restriction on the generality of the invention described above.

BRIEF DESCRIPTION OF THE DRAWINGS/FIGURES

Figure 1:
FIG. 1 shows the necrosis of the untreated control at 15DAAB-Grapevine cv. Sauvignon Blanc, as described in Example 8.
Figure 2:
FIG. 2 shows grapevine cv. Sauvignon Blanc following two applications of WOB NP1 at the lowest application rate of 35+119.6 g ai/100 L (15DAAB), as described in Example 8.
Figure 3A:
FIG. 3a shows necrosis of tissue on grapevine cv. Sauvignon Blanc following two applications of WOB NP1 at 70+239.2 g ai/100 L (15DAAB), as described in Example 8.
Figure 3B:
FIG. 3b shows necrosis (as indicated by circled regions) of tissue on grapevine cv. Sauvignon Blanc following two applications of WOB NP1 at 70+239.2 g ai/100 L (15DAAB), as described in Example 8.
Figure 4A:
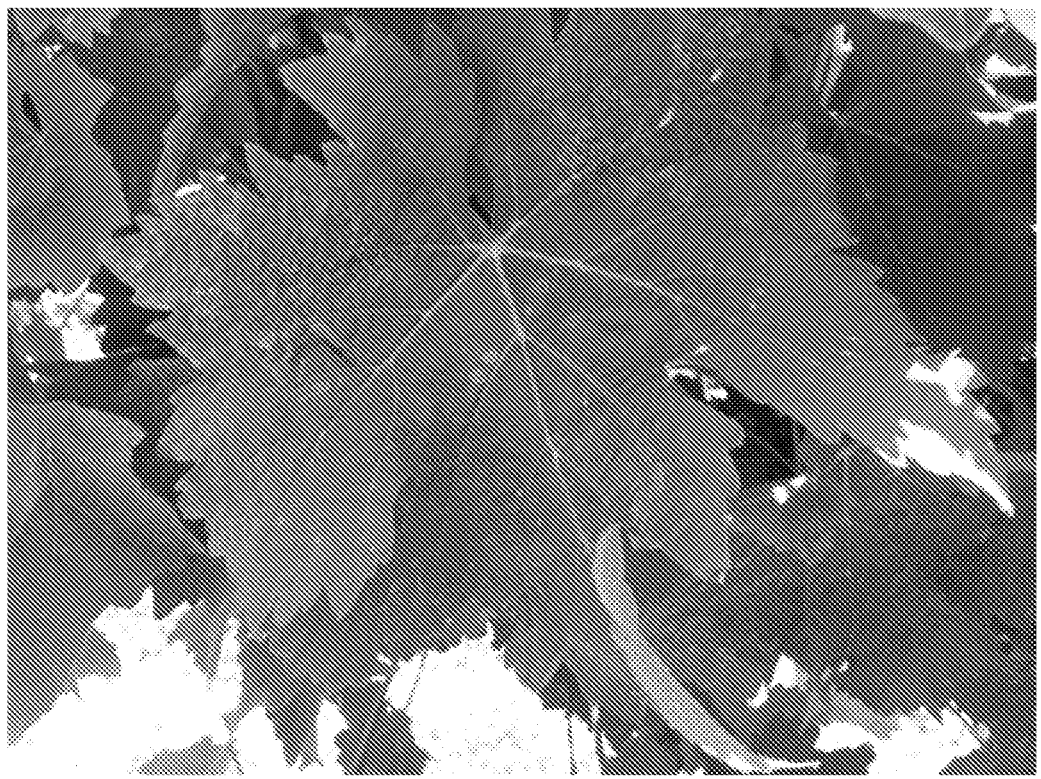
FIG. 4a shows necrosis of tissue on grapevine cv. Sauvignon Blanc following two applications of WOB NP1 at 140+478.4 g ai/100 L (15DAAB), as described in Example 8.
Figure 4B:
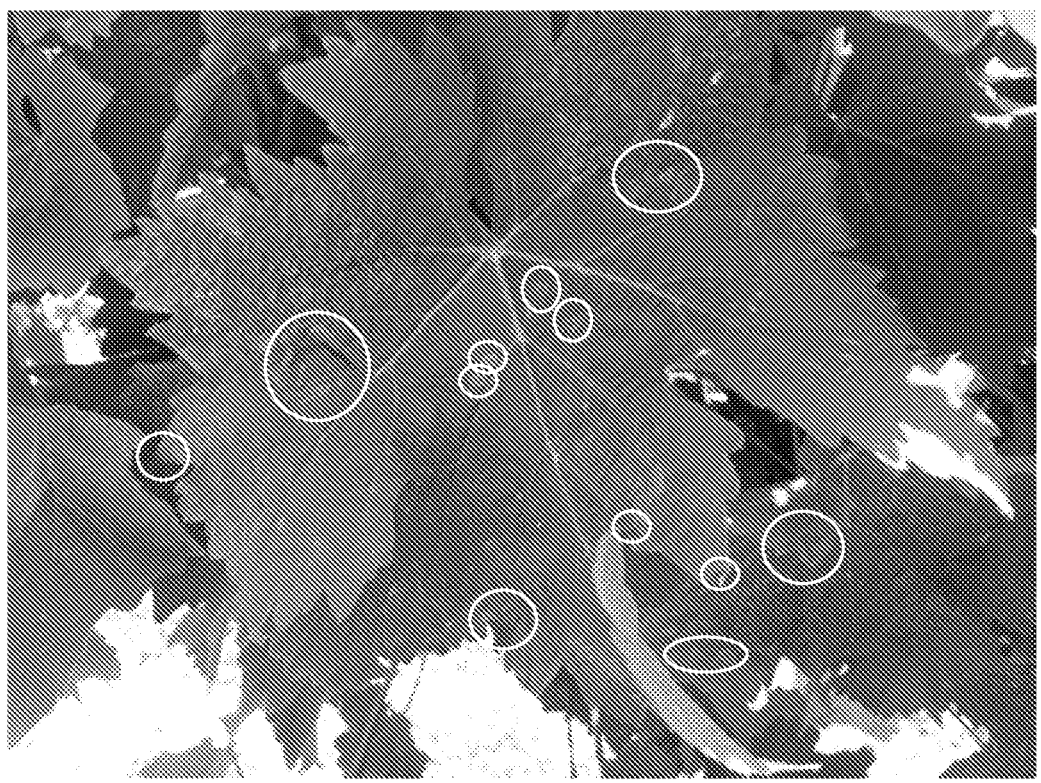
FIG. 4b shows necrosis (as indicated by circled regions) of tissue on grapevine cv. Sauvignon Blanc following two applications of WOB NP1 at 140+478.4 g ai/100 L (15DAAB), as described in Example 8.
Figure 5A:
FIG. 5a shows necrosis of tissue on grapevine cv. Sauvignon Blanc following two applications of WOB NP1 at 280+956.8 g ai/100 L (15DAAB), as described in Example 8.
Figure 5B:
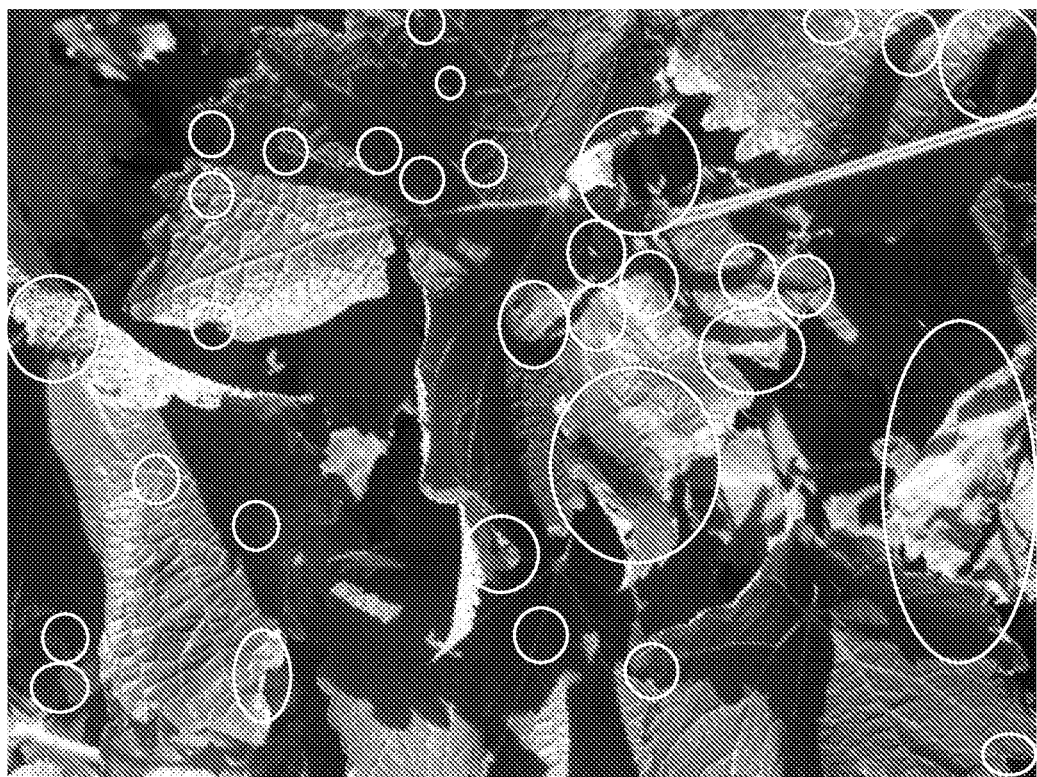
FIG. 5b shows necrosis (as indicated by circled regions) of tissue on grapevine cv. Sauvignon Blanc following two applications of WOB NP1 at 280+956.8 g ai/100 L (15DAAB), as described in Example 8.
Figure 6A:
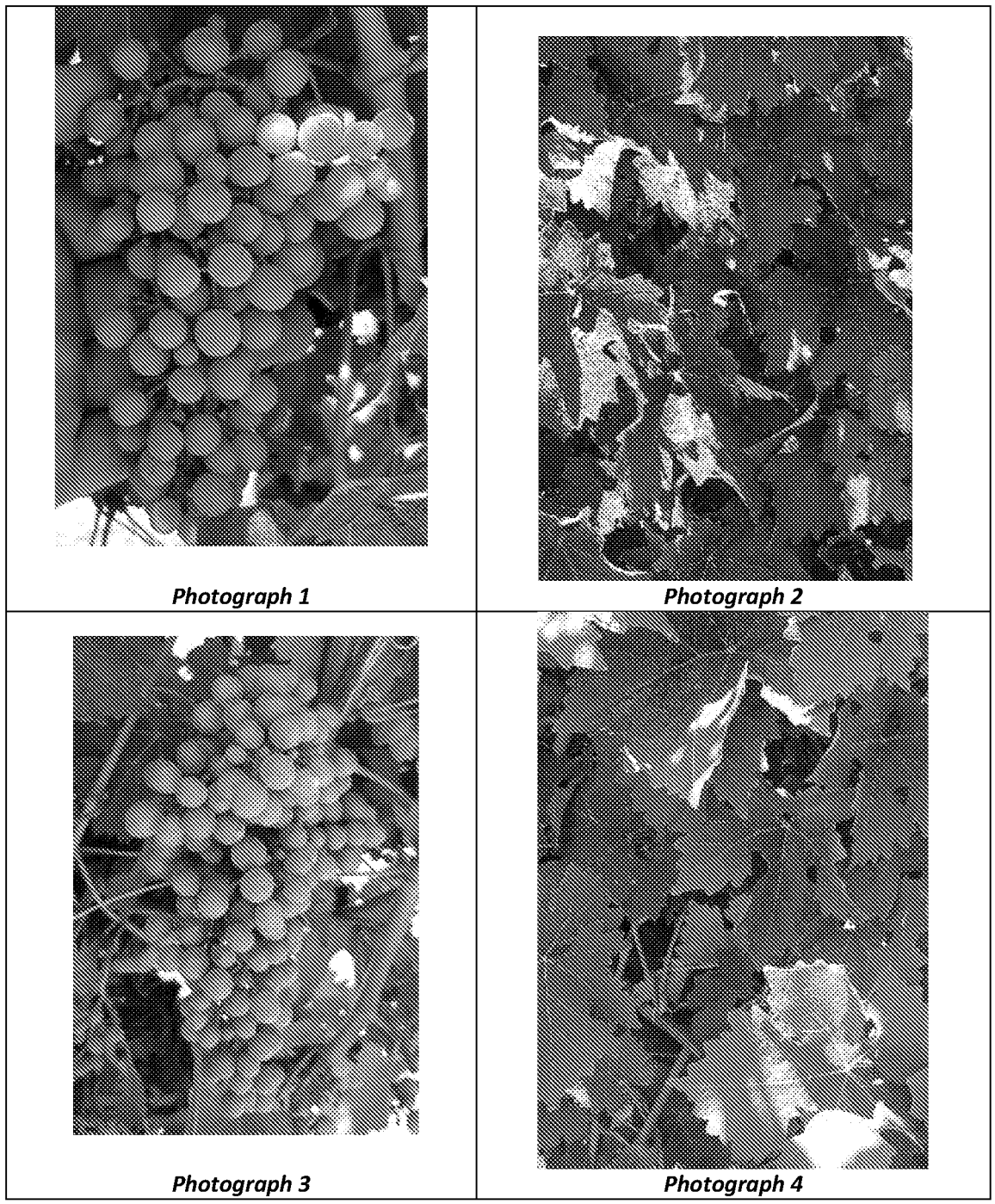

FIG. 6a shows necrosis studies, leaf damage and bunch residue 114DAB as described in Example 9. (Clockwise from top left) Photograph 1: Untreated control bunches. Photograph 2: Untreated leaves. Photograph 3: WOB NP1 (35.0+119.6 g ai/100 L) bunches. Photograph 4: WOB NP1 (35.0+119.6 g ai/100 L) leaves.

Figure 6B:
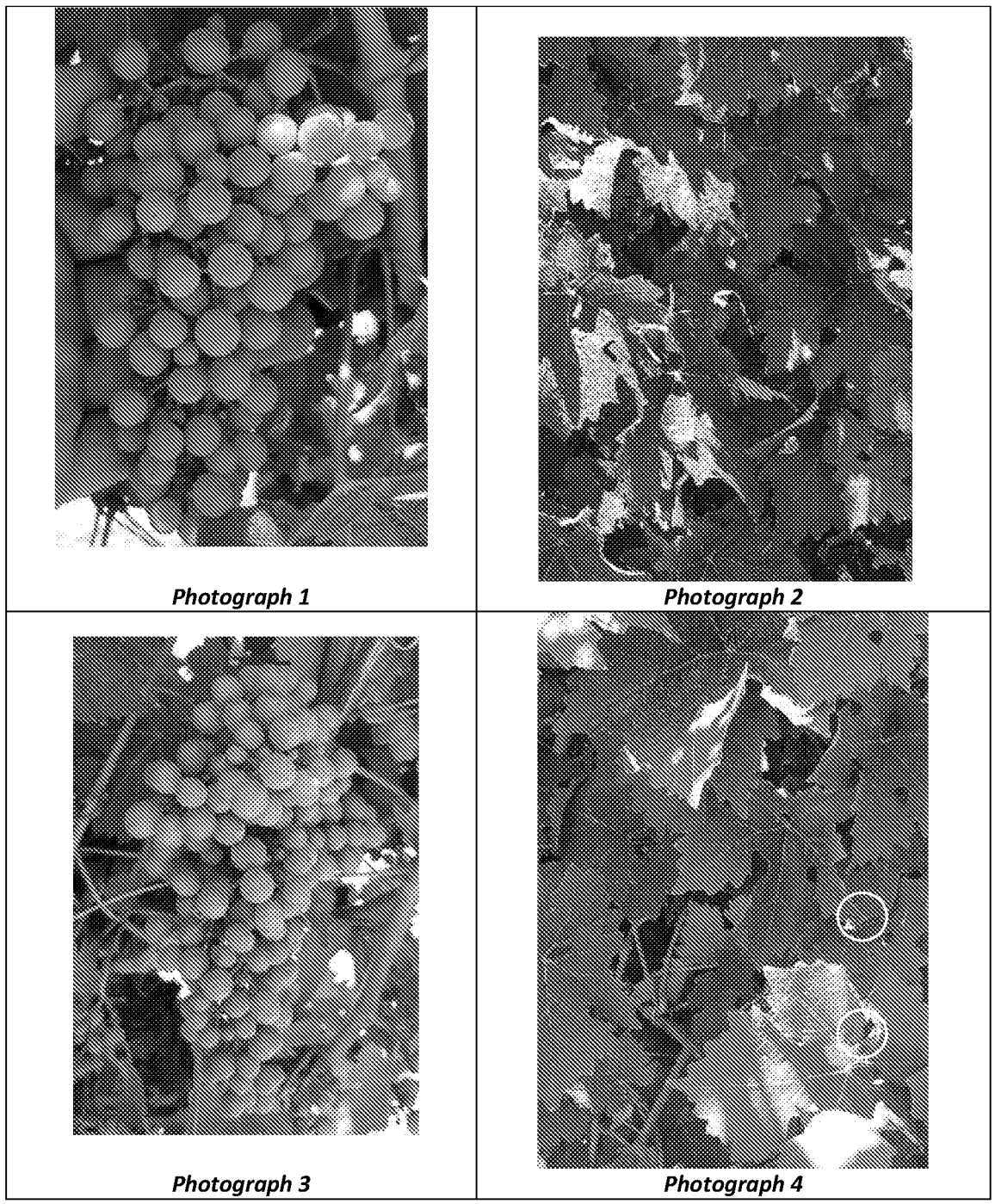

FIG. 6b shows necrosis studies, leaf damage (as indicated by circled regions) and bunch residue 114DAB as described in Example 911. (Clockwise from top left) Photograph 1: Untreated control bunches. Photograph 2: Untreated leaves. Photograph 3: WOB NP1 (35.0+119.6 g ai/100 L) bunches. Photograph 4: WOB NP1 (35.0+119.6 g ai/100 L) leaves.

Figure 7A:
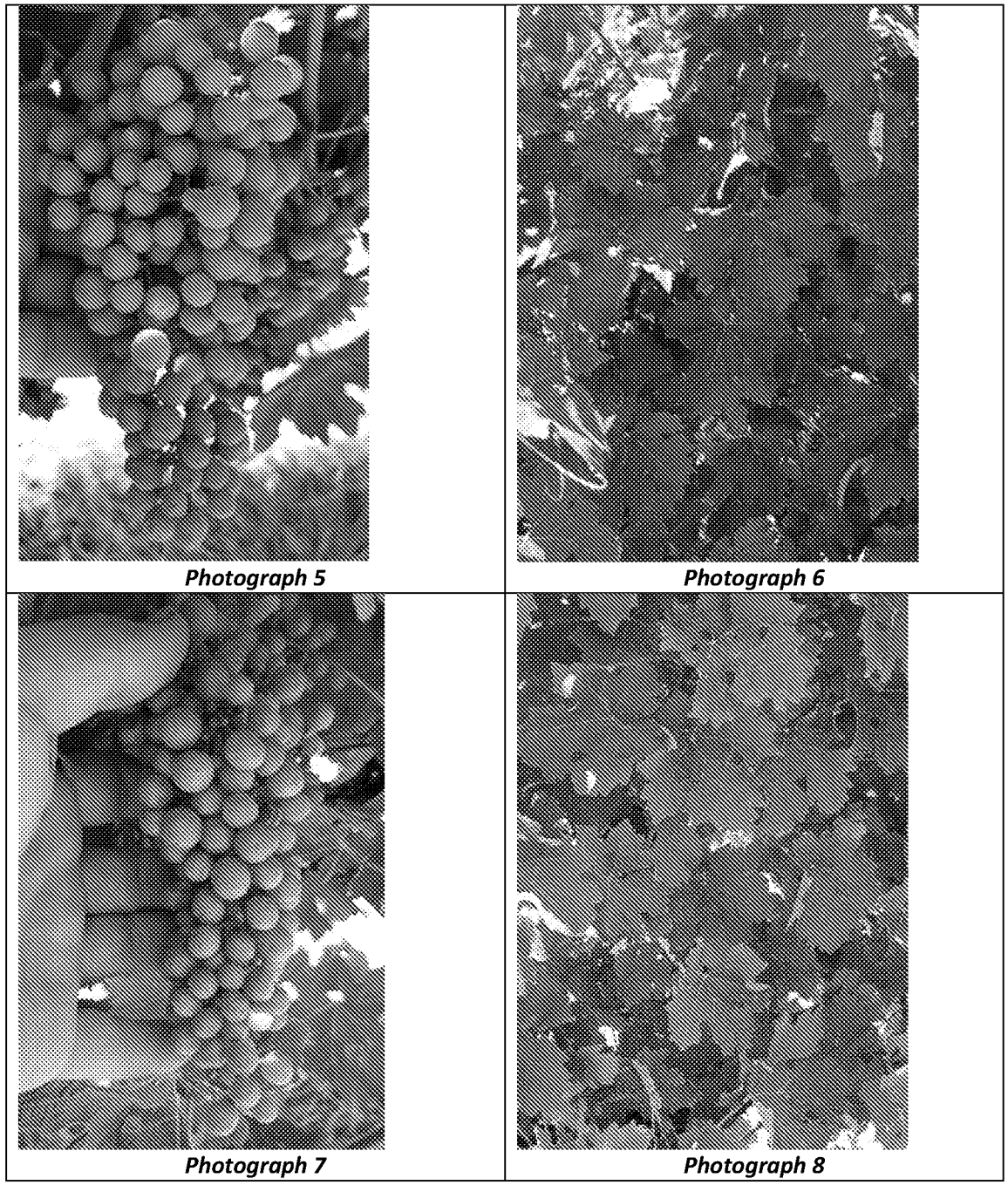

FIG. 7a shows necrosis studies, as described in Example 9. (Clockwise from top left) Photograph 5: WOB NP1 (70.0+239.2 g ai/100 L) bunches. Photograph 6: WOB NP1 (70.0+239.2 g ai/100 L) leaves. Photograph 7: WOB NP1 (140.0+478.4 g ai/100 L) bunches. Photograph 8: WOB NP1 (140.0+478.4 g ai/100 L) leaves.

Figure 7B:
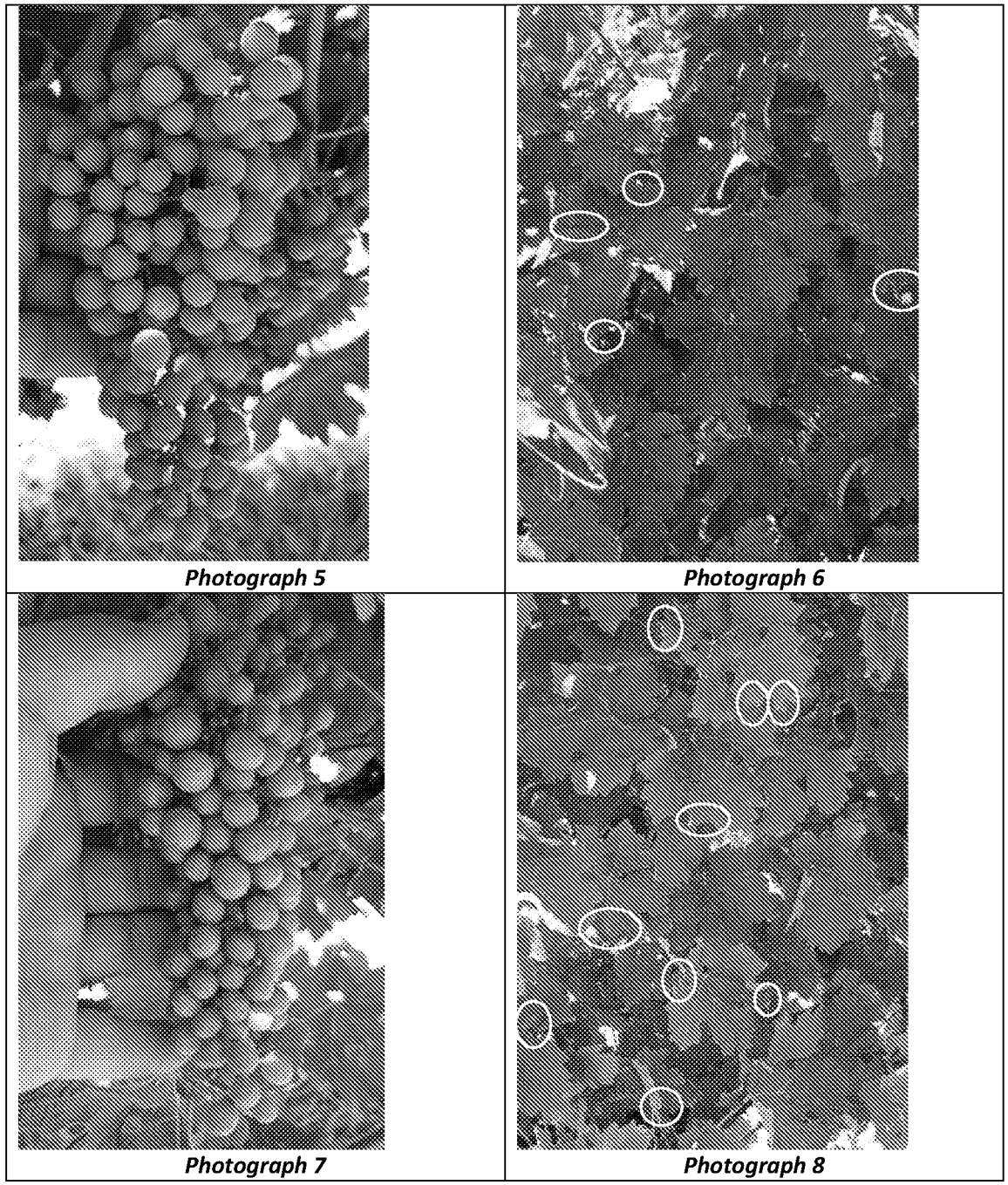

FIG. 7b shows necrosis studies, as described in Example 9. (Clockwise from top left) Photograph 5: WOB NP1 (70.0+239.2 g ai/100 L) bunches. Photograph 6: WOB NP1 (70.0+239.2 g ai/100 L) leaves with leaf damage as indicated by circled regions. Photograph 7: WOB NP1 (140.0+478.4 g ai/100 L) bunches. Photograph 8: WOB NP1 (140.0+478.4 g ai/100 L) leaves with leaf damage as indicated by circled regions.

Figure 8A:
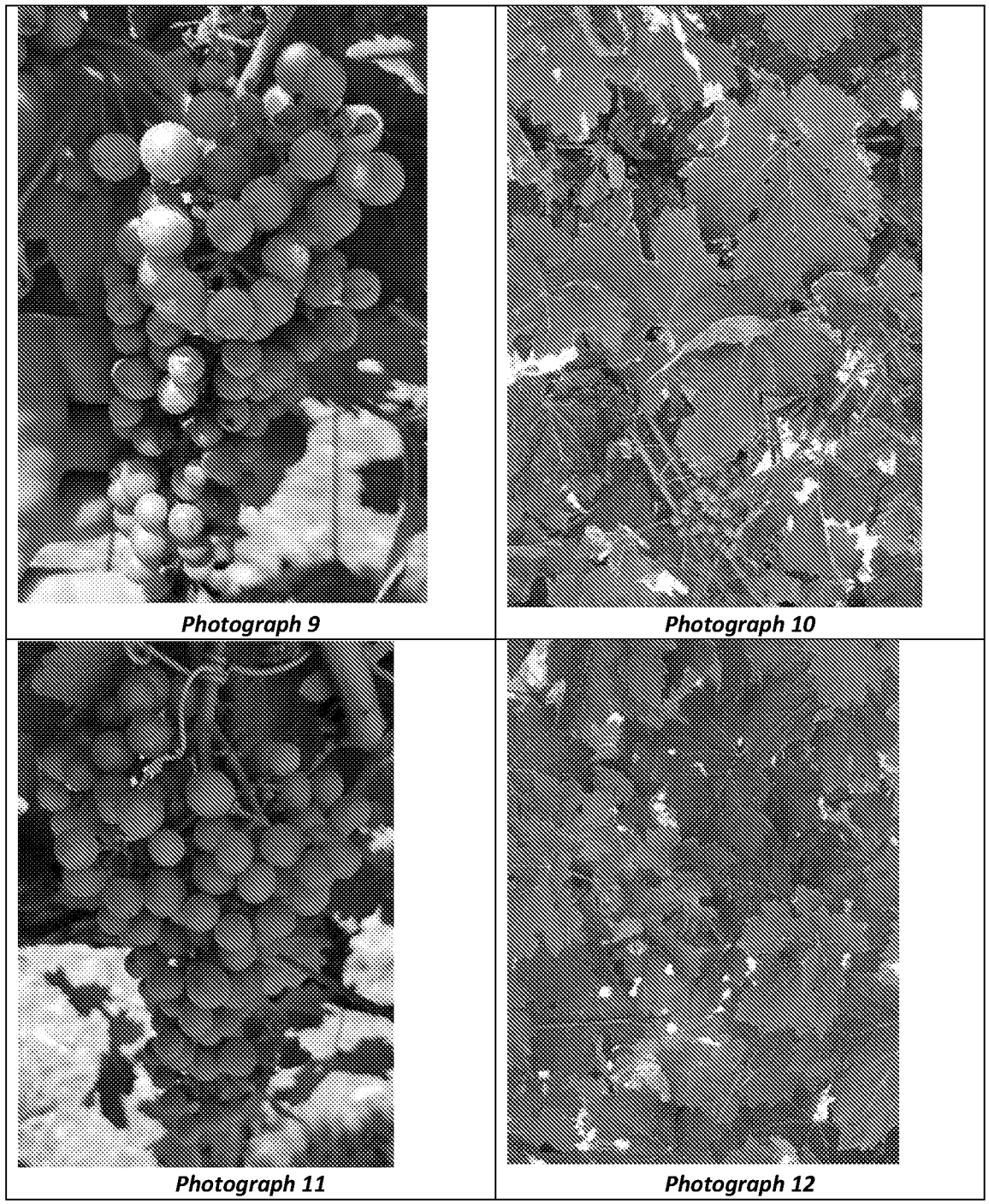

FIG. 8a shows necrosis studies, as described in Example 9. (Clockwise from top left) Photograph 9: WOB NP1 (280.0+956.8 g ai/100 L) bunches. Photograph 10: WOB NP1 (280.0+956.8 g ai/100 L) leaves. Photograph 11: Standard control program bunches. Photograph 12: Standard control program leaves.

Figure 8B:
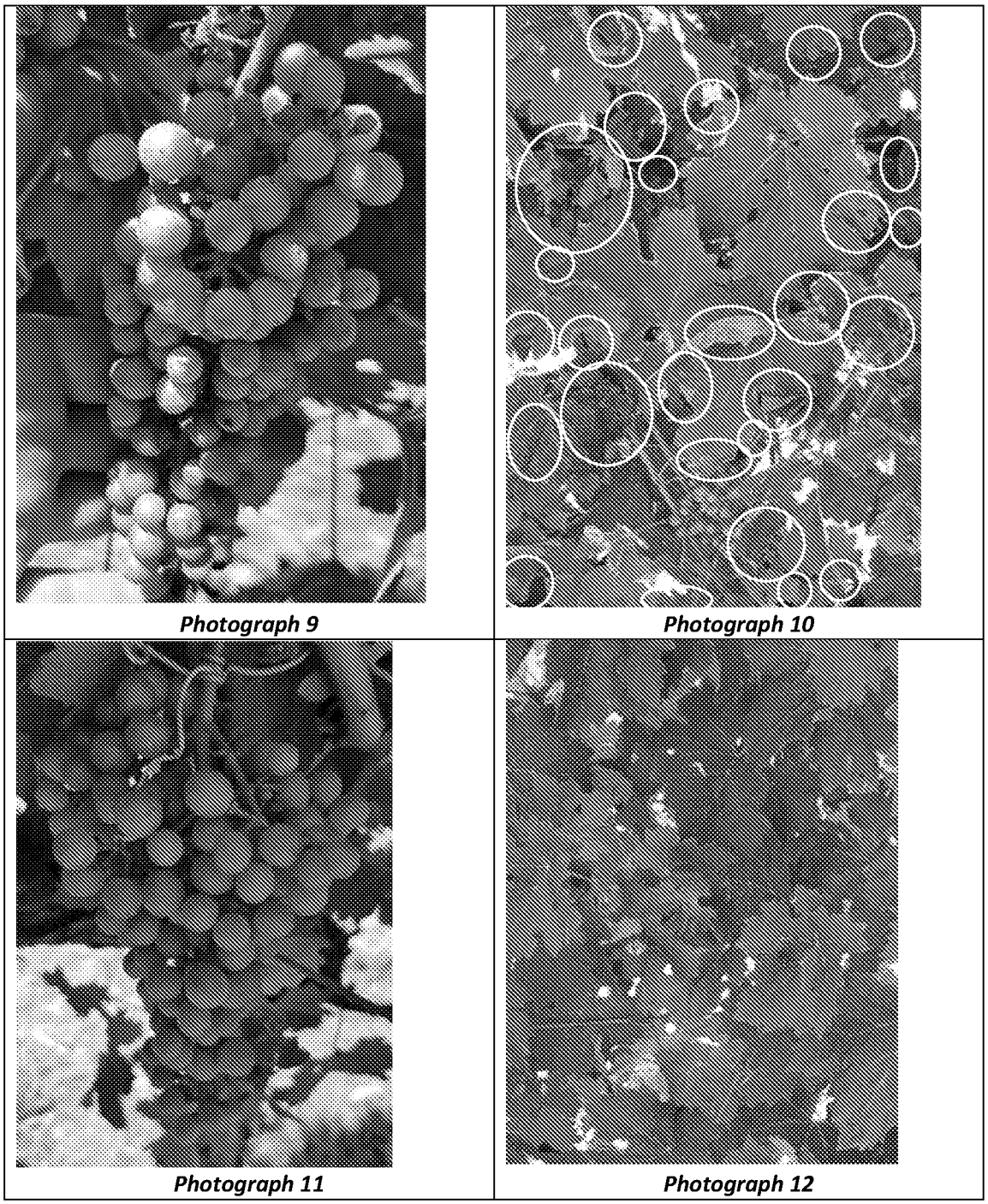

FIG. 8b shows necrosis studies, as described in Example 9. (Clockwise from top left) Photograph 9: WOB NP1 (280.0+956.8 g ai/100 L) bunches. Photograph 10: WOB NP1 (280.0+956.8 g ai/100 L) leaves with leaf damage as indicated by circled regions.

Photograph 11: Standard control program bunches. Photograph 12: Standard control program leaves.

Figure 9:
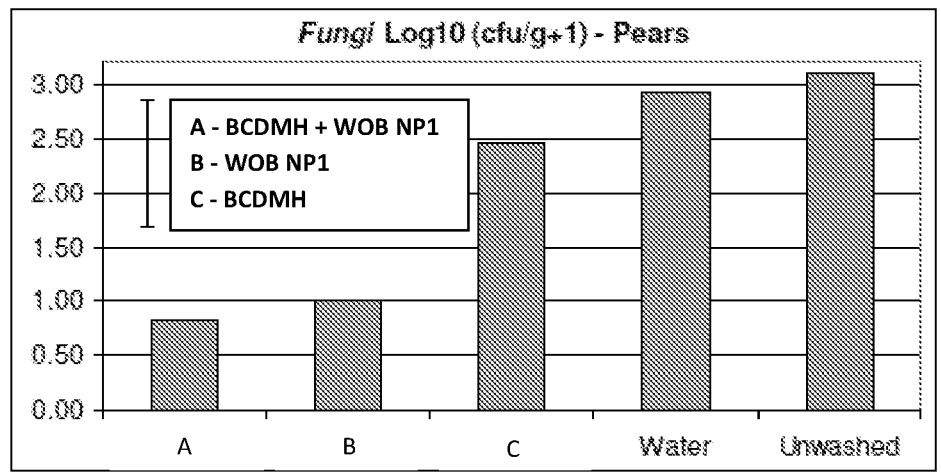

FIG. 9 shows Log 10 of cfu/g+1 of fungi on pears washed with either water, WOB NP1, BCDMH or BCDMH+WOB NP1. LSD=1.166.

Figure 10:
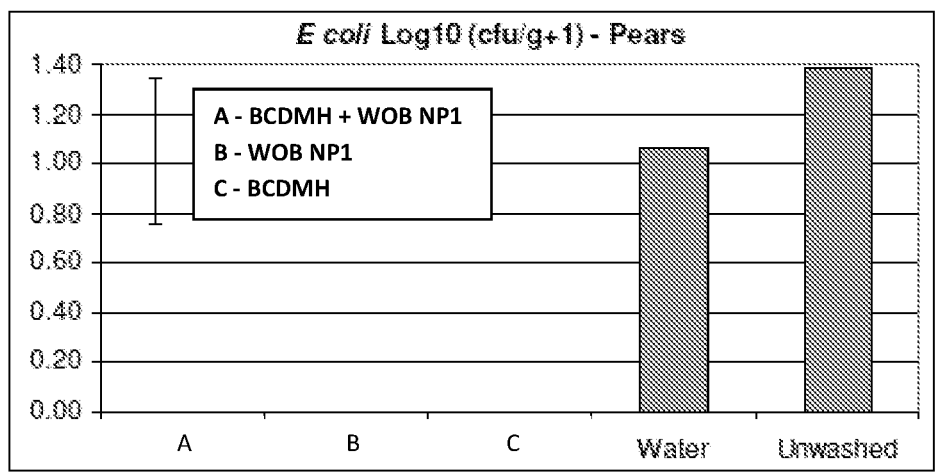

FIG. 10 shows Log 10 of cfu/g+1 of *E. coli* on pears washed with either water, WOB NP1, BCDMH or BCDMH+WOB NP1 LSD=0.593.

Figure 11:
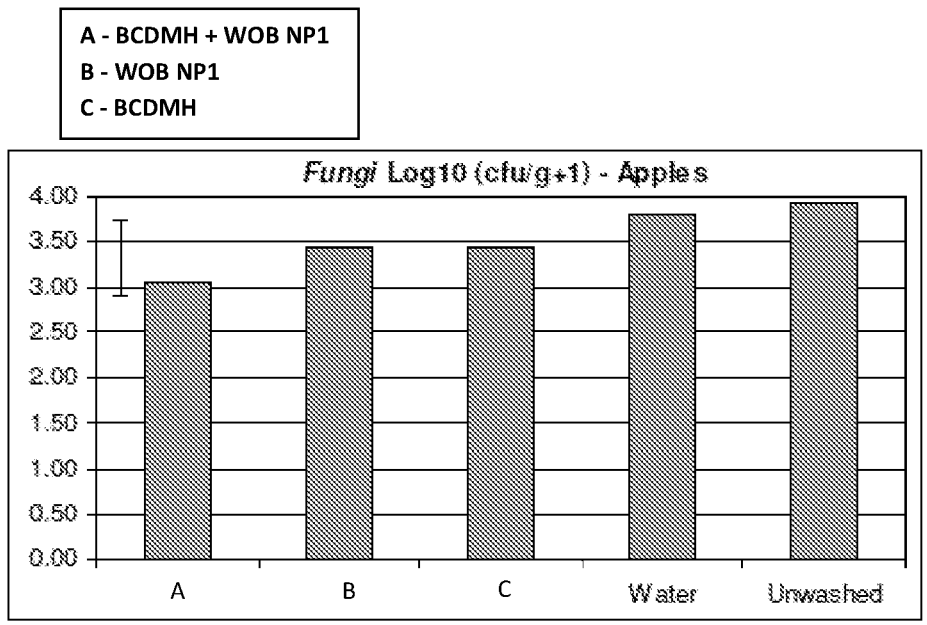

FIG. 11 shows Log 10 of cfu/g+1 of fungi on apples washed with either water, WOB NP1, BCDMH or BCDMH+WOB NP1 LSD=0.869.

Figure 12:
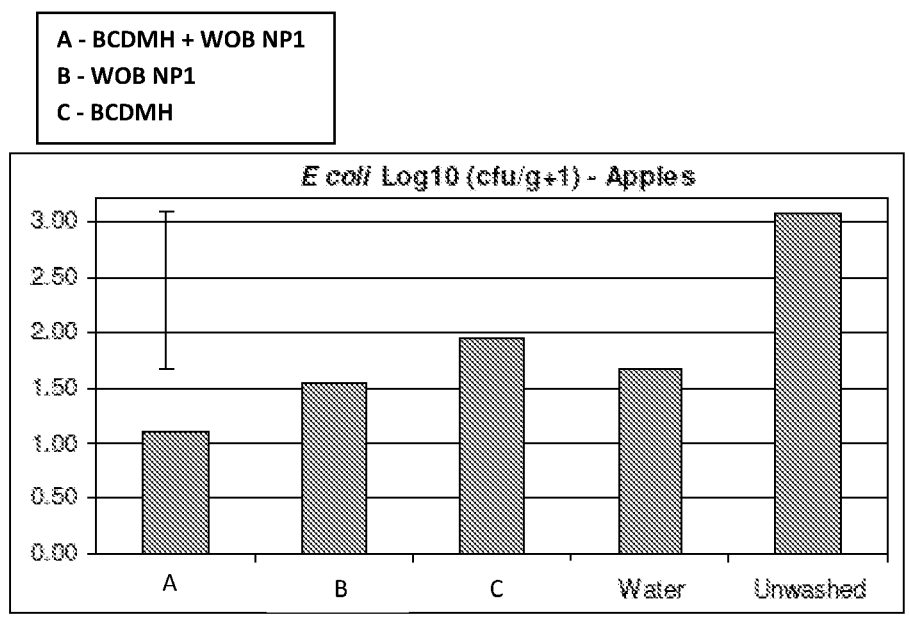

FIG. 12 shows Log 10 of cfu/g+1 of *E. coli* on apples washed with either water, WOB NP1, BCDMH or BCDMH+WOB NP1. One obvious outlier was removed from the unwashed data prior to analysis. LSD=1.352.

Figure 13:
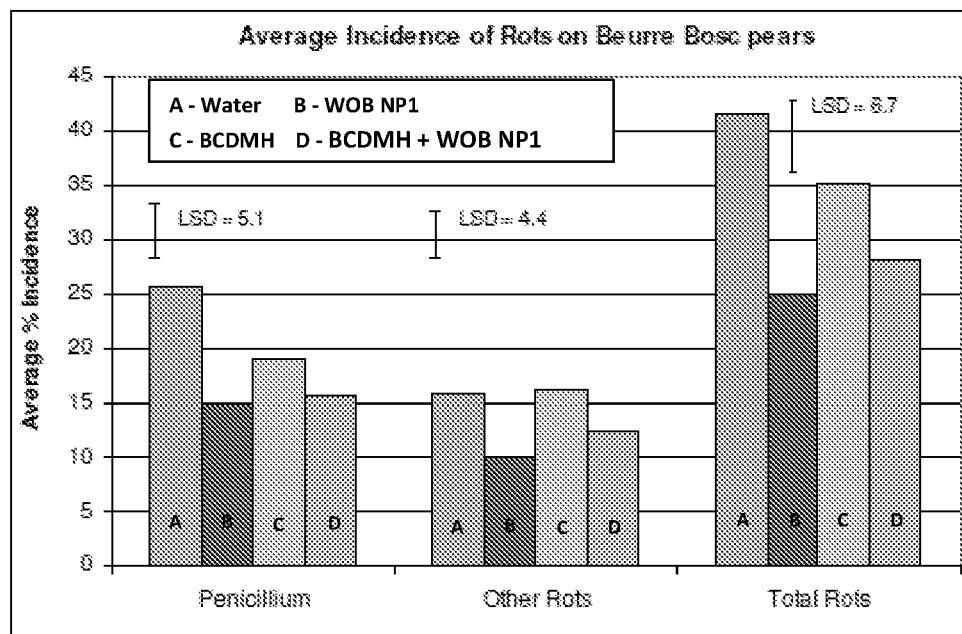

FIG. 13 shows Incidence of rots after storage on pears washed with either water, WOB NP1, BCDMH or BCDMH+WOB NP1.

Figure 14:
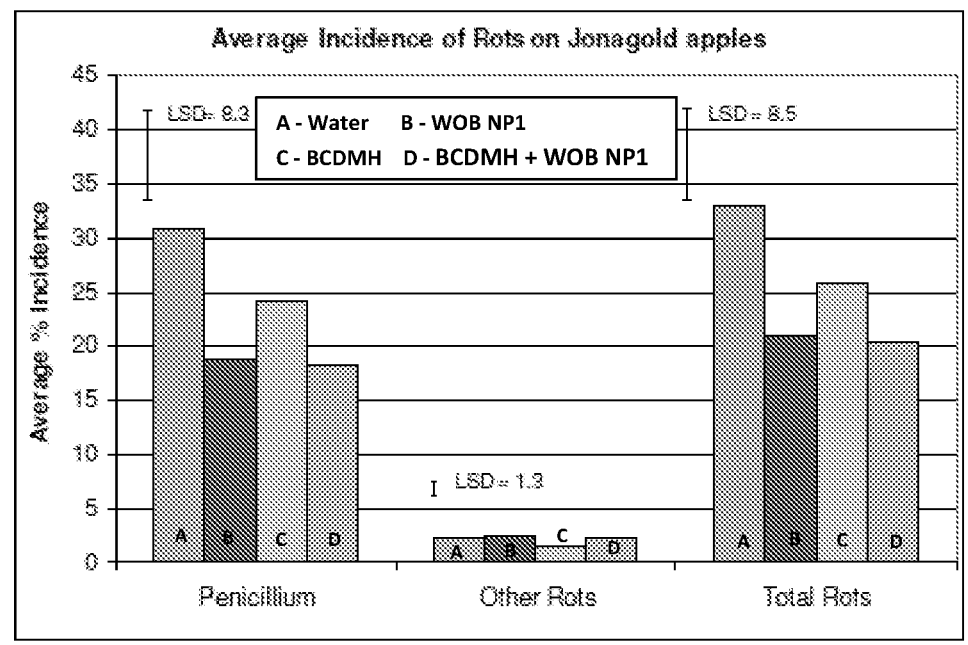

FIG. 14 shows Incidence of rots after storage on apples washed with either water, WOB NP1, BCDMH or BCDMH+WOB NP1.

EXAMPLE 1—PREPARATION OF THE DRY FORMULATION 25 kg of sodium metabisulphite is combined with 67 kg of a sodium benzoate powder and then 1 kg of DIACEL® 150 (cellulose) (CAS #9000-34-6) is further added. The resulting mixture is then blended by addition to a cement mixer. The resulting mixture is then blended by addition to a cement mixer (100 L capacity revolving drum mixer with a 880 W 1440RPM electric motor). The mixture is blended for 10 minutes, allowed to stand for 10 minutes and further blended for an additional 10 minutes. The described process provides 93 kg of the dry composition.

EXAMPLE 2—PREPARATION OF A FORMULATION COMPRISING A SURFACTANT

To 93 kg of the dry composition is added 5 kg of polyethylene glycol and the resulting composition is blended by addition to a cement mixer (100 L capacity revolving drum mixer with a 880 W 1440 RPM electric motor). The mixture is blended for 10 minutes, allowed to stand for 10 minutes and further blended for an additional 10 minutes. The described process provides of 98 kg of the desired formulation.

40 g of the pre-prepared formulation is added to 10 L of water and mixed with agitation and the resulting dispersion is allowed to stand for 10 minutes to ensure the powder formulation is dissolved.

EXAMPLE 3—PH STUDY FOR DILUTED 'DRY COMPOSITIONS'

Preparation of Products

WOB NP 1 and WOB PH1 were prepared according to the general method of Example 1, wherein sodium sulphite is substituted for sodium metabisulphite in the case of WOB PH 1. The method of Example 1 was further modified whereby the sodium benzoate added was in the form of a prill bead rather than a powder.

The water used throughout the projects is rainwater held in the dark in a plastic tank with stable pH value of 6.25. Controls were set up by replacing actives with tank water only.

Products were dissolved in tank water before application to the agar plants. Tank water (pH 6.25) was adjusted to the respective pH levels prior to adding the actives to determine the change in pH caused by the actives.

Tank water was adjusted to pH 4.0, 5.5, and 7.0 before adding sodium benzoate, sodium metabisulphite and WOB NP1, each at 0.8%.

Tank water was adjusted to pH 7.0, 7.5 and 8.4 before adding sodium benzoate, sodium sulphite and WOB PH1, each at 0.8%.

TABLE 1

Recorded pH of Sodium metabisulphite, sodium benzoate and WOB NP1 in tank water (pH range 4.0-7.0).

|  | pH of water before product added | pH of water after product added | pH after active added in unamended tank water |
|---|---|---|---|
| Tank water | 6.25 | | |
| Na metabisulphite | 4.0 | 3.75 | 4.74 |
|  | 5.5 | 5.52 | |
|  | 7.0 | 6.14 | |
| Na Benzoate | 4.0 | 6.15 | 4.78 |
|  | 5.5 | 6.34 | |
|  | 7.0 | 6.60 | |
| WOB NP1 | 4.0 | 4.8 | 5.14 |
|  | 5.5 | 5.77 | |
|  | 7.0 | 6.39 | |

TABLE 2

Recorded pH of Sodium sulphite, sodium benzoate and WOB NP1 in tank water (pH range 7.0-8.4).

|  | pH of water before product added | pH of water after product added | pH after active added in unamended tank water |
|---|---|---|---|
| Tank water | 6.25 | | |
| Na sulphite | 7.0 | 6.78 | 5.24 |
|  | 7.5 | 6.78 | |
|  | 8.4 | 6.99 | |
| Na Benzoate | 7.0 | 6.74 | 4.78 |
|  | 7.5 | 6.80 | |
|  | 8.4 | 6.85 | |
| WOB PH1 | 7.0 | 6.68 | 5.24 |
|  | 7.5 | 6.66 | |
|  | 8.4 | 6.67 | |

EXAMPLE 4—IN VITRO STUDIES FOR INHIBITION OF CROP PATHOGENS (STUDY 1—DILUTED DRY FORMULATION)

Preparation of Test Media

The fungal and bacterial pathogens *Erwinia carotovora* (bacterial) and *Botrytis cinerea* (fungal) were cultured on to Nutrient Agar (NA) and potato dextrose agar (PDA), respectively and incubated at ambient temperature until sporulating or well grown.

Multiple plates of PDA were inoculated with *B. cinerea* and allowed to sporulate. Multiple plates of NA were inoculated with *E. carotovora* and allowed to grow into a thick lawn.

Curative Activity:

Plates of PDA and NA were inoculated with fungal spores and bacterial cells, respectively, and allowed to grow into a lawn covering the agar surfaces. Three replicates were used for each product and each pH. Following the results from the preliminary tests, pH 4.0 and 7.0 were selected for all further product pH tests.

When the lawns were well grown and sporulating in the case of the fungal pathogen, five discs soaked with 200 uL of each product (sodium metabisulphite, sodium benzoate, WOB NP1, sodium sulphite, and WOB PH1) at appropriate pH levels were laid onto the sporulating surface or cell lawn surface for the fungal pathogen and the bacterial pathogen, respectively.

The plates were incubated at ambient temperature (14-25° C.). Inhibition zones were measured at 24 hours, 48 hours and 7 days.

Preventative Activity:

Plates of agar containing each product (Na metabisulphite, Na Benzoate, WOB NP1 of Example 3) and (Na sulphite, Na Benzoate, WOB PH1) at concentrations equivalent to 0.8% concentration were made up and poured into sterile disposal Petri dishes. Three replicates for each product and pH (4.0 and 7.0) were used.

Sterile agar discs covered with bacterial cells or fungal hyphae and spores were cut from respective plates of *B. cinerea* and *E. carotovora*. Three discs were each laid culture surface down onto the amended agar surface, incubated at ambient temperatures (14-25° C.) and observed for inhibition zones at 24 hours, 48 hours and 7 days.

TABLE 3

Sodium metabisulphite activity on the growth of E. carotovora.

| Active | Pathogen | Time | Reps | pH | Results Curative | Preventative |
|---|---|---|---|---|---|---|
| Na metabisulphite | E. carotovora | 24 hrs | 1, 2, 3 | 4.0 | No effect | No growth away from core onto agar surface. Growth 2-3 mm onto agar from core. Cells not freely spreading |
| | | 48 hrs | 1, 2, 3 | | Clear 2-3 mm back from active disc | Limited growth onto agar surface 2-3 mm |
| | | 7 days | 1, 2, 3 | | Clearing around disc still apparent. Active is still affecting pathogen | Limited growth onto agar surface 2-3 mm |

TABLE 4

Sodium metabisulphite activity on the growth of B. cinerea.

| Active | Pathogen | Time | Reps | pH | Results Curative | Preventative |
|---|---|---|---|---|---|---|
| Na metabisulphite | B. cinerea | 24 hrs | 1, 2, 3 | 4.0 | No effect | Sporulation heavy on core. Some hyphae growing on agar. |
| | | 48 hrs | 1, 2, 3 | | Hyphae unhealthy around discs. | Some hyphae on agar surface. |
| | | 7 days | 1, 2, 3 | | No sporulation immediately around active discs. Hyphae appeared unhealthy with loss of turgor. Collapsing hyphae. Sporulation reduced. | Restricted hyphal growth. Unhealthy—little sporing on agar. |

TABLE 5

Sodium benzoate activity on the growth of E. carotovora.

| Active | Pathogen | Time | Reps | pH | Results Curative | Preventative |
|---|---|---|---|---|---|---|
| Na benzoate | E. carotovora | 24 hrs | 1, 2, 3 | 4.0 | No obvious effect | Strong growth around plugs on all reps. Cells compacted & not spreading freely. |
| | | 48 hrs | 1, 2, 3 | | No obvious effect | Strong growth around plugs on all reps. Cells compacted & not spreading freely. |
| | | 7 days | 1, 2, 3 | | Growth restricted around disc. No growth onto discs. | Growth out from plug but clumping and restricted in spread. |

TABLE 6

Sodium benzoate activity on the growth of B. cinerea.

| Active | Pathogen | Time | Reps | pH | Results Curative | Preventative |
|---|---|---|---|---|---|---|
| Na benzoate | B. cinerea | 24 hrs | 1 | 4.0 | No obvious effect | Heavy sporulation on plug. Hyphae grown onto agar surface but not into agar containing active. |
|  |  |  | 2 |  |  |  |
|  |  |  | 3 |  |  |  |
|  |  | 48 hrs | 1 |  | Sporulation up to discs. Some collapsing of hyphae and conidiophores. | Heavy sporulation on plug Hyphae grown onto agar surface |
|  |  |  | 2 |  |  |  |
|  |  |  | 3 |  |  |  |
|  |  | 7 days | 1 |  | Reduced sporulation around discs. Hyphae collapsing. | Unhealthy hyphae & restricted sporing on plugs. Restricted growth on agar. Hyphae very unhealthy—loss of turgor. |
|  |  |  | 2 |  |  |  |
|  |  |  | 3 |  |  |  |

TABLE 7

WOB NP1 activity on the growth of E. carotovora.

| Active | Pathogen | Time | Reps | pH | Results Curative | Preventative |
|---|---|---|---|---|---|---|
| WOB NP1 | E. carotovora | 24 hrs | 1 | 4.0 | No obvious effect | Strong growth out from plugs |
|  |  |  | 2 |  |  |  |
|  |  |  | 3 |  |  |  |
|  |  | 48 hrs | 1 |  | No obvious effect | Strong but restricted growth out from plugs |
|  |  |  | 2 |  |  |  |
|  |  |  | 3 |  |  |  |
|  |  | 7 days | 1 |  | 1-2 mm of restricted growth around discs. | Growth rings less than on pH 7.0 plates. |
|  |  |  | 2 |  |  |  |
|  |  |  | 3 |  |  |  |

TABLE 8

WOB NP1 activity on the growth of B. cinerea.

| Active | Pathogen | Time | Reps | pH | Results Curative | Preventative |
|---|---|---|---|---|---|---|
| WOB NP1 | B. cinerea | 24 hrs | 1 | 4.0 | No obvious effect | Little sporulation but some hyphal growth on & in agar. |
|  |  |  | 2 |  |  |  |
|  |  |  | 3 |  |  |  |
|  |  | 48 hrs | 1 |  | Hyphal growth unhealthy—reduced sporing. | Little sporulation but some hyphal growth on & in agar. |
|  |  |  | 2 |  |  |  |
|  |  |  | 3 |  |  |  |
|  |  | 7 days | 1 |  | Hyphal growth unhealthy—reduced sporing. | Sporulation restricted to plug—little on agar. Hyphae unhealthy. |
|  |  |  | 2 |  |  |  |
|  |  |  | 3 |  |  |  |

TABLE 9

Sodium sulphite activity on the growth of E. carotovora.

| Active | Pathogen | Time | Reps | pH | Results Curative | Preventative |
|---|---|---|---|---|---|---|
| Na sulphite | E. carotovora | 24 hrs | 1 | 7.0 | Growth out from plug. | Growth out from plug onto agar. |
|  |  |  | 2 |  |  |  |
|  |  |  | 3 |  |  |  |
|  |  | 48 hrs | 1 |  | More growth but restricted & clumping | More growth but limited |
|  |  |  | 2 |  |  |  |
|  |  |  | 3 |  |  |  |

TABLE 9-continued

Sodium sulphite activity on the growth of E. carotovora.

| Active | Pathogen | Time | Reps | pH | Curative | Preventative |
|---|---|---|---|---|---|---|
| | | 7 days | 1 | | Growth onto agar. More than at pH 4.0 | Growth onto agar greater than pH 4.0. |
| | | | 2 | | | |
| | | | 3 | | | |

TABLE 10

Sodium sulphite activity on the growth of B. cinerea.

| Active | Pathogen | Time | Reps | pH | Curative | Preventative |
|---|---|---|---|---|---|---|
| Na sulphite | B. cinerea | 24 hrs | 1 | 7.0 | No effect | Less sporulation than on pH 4.0 plates |
| | | | 2 | | | |
| | | | 3 | | | |
| | | 48 hrs | 1 | | Hyphae unhealthy around active discs. | Greater spread of hyphae than on pH 4.0 plates |
| | | | 2 | | | |
| | | | 3 | | | |
| | | 7 days | 1 | | No sporulation immediately around discs containing active. Hyphae appeared unhealthy with loss of turgor. | Heavy sporulation on plugs. Restricted hyphal growth with some sporulation onto agar. |
| | | | 2 | | | |
| | | | 3 | | | |

TABLE 11

Sodium benzoate activity on the growth of E. carotovora.

| Active | Pathogen | Time | Reps | pH | Curative | Preventative |
|---|---|---|---|---|---|---|
| Na benzoate | E. carotovora | 24 hrs | 1 | 7.0 | No effect | Strong growth around plugs. Greater than on pH 4.0 plates |
| | | | 2 | | | |
| | | | 3 | | | |
| | | 48 hrs | 1 | | Reduced growth back from disc | No increase in spread but cells piling onto top of each other—ie restricted outward growth |
| | | | 2 | | | |
| | | | 3 | | | |
| | | 7 days | 1 | | Clearing around discs still apparent. Active is still affecting pathogen | Growth on agar greater than pH 4.0 |
| | | | 2 | | | |
| | | | 3 | | | |

TABLE 12

Sodium benzoate activity on the growth of *B. cinerea*.

| | | | | | Results | |
|---|---|---|---|---|---|---|
| Active | Pathogen | Time | Reps | pH | Curative | Preventative |
| Na benzoate | *B. cinerea* | 24 hrs | 1 | 7.0 | No effect | Greater hyphal growth on & in agar but no sporing. |
| | | | 2 | | | |
| | | | 3 | | | |
| | | 48 hrs | 1 | | Hyphae unhealthy around discs | Greater hyphal growth on & in agar but no sporing. |
| | | | 2 | | | |
| | | | 3 | | | |
| | | 7 days | 1 | | No sporulation immediately around discs containing active. Hyphae appeared unhealthy with loss of turgor. Growth greater than on pH 4.0 plates | Similar to pH 4.0 plates but more sporulation on the agar hyphae. |
| | | | 2 | | | |
| | | | 3 | | | |

TABLE 13

WOB PH1 activity on the growth of *E. carotovora*.

| | | | | | Results | |
|---|---|---|---|---|---|---|
| Active | Pathogen | Time | Reps | pH | Curative | Preventative |
| WOB PH1 | *E. carotovora* | 24 hrs | 1 | 7.0 | No obvious effect | Clumped growth around plugs. |
| | | | 2 | | | |
| | | | 3 | | | |
| | | 48 hrs | 1 | | No obvious effect | Restricted growth around plugs. |
| | | | 2 | | | |
| | | | 3 | | | |
| | | 7 days | 1 | | No growth onto the discs. | Restricted growth around plugs but rings of growth. |
| | | | 2 | | | |
| | | | 3 | | | |

TABLE 14

WOB PH1 activity on the growth of *B. cinerea*.

| | | | | | Results | |
|---|---|---|---|---|---|---|
| Active | Pathogen | Time | Reps | pH | Curative | Preventative |
| WOB PH1 | *B. cinerea* | 24 hrs | 1 | 7.0 | No obvious effect | Little sporulation. Hyphal growth on & in agar |
| | | | 2 | | | |
| | | | 3 | | | |
| | | 48 hrs | 1 | | Minimal sporulation onto discs | Little sporulation. Hyphal growth on & in agar |
| | | | 2 | | | |
| | | | 3 | | | |
| | | 7 days | 1 | | Damaged hyphae around discs. Effect of active persisting. | Little sporulation in hyphae on agar but sclerotia forming on hyphae on agar. Sclerotia sign of unhealthy colony. |
| | | | 2 | | | |
| | | | 3 | | | |

The observed results for the two products as (WOB NP1 and WOB PH1) were not as expected. Both WOB products were observed to have little or no effect on curative or preventative inhibition of *E. carotovora* and *B. cinerea* pathogen growth.

EXAMPLE 5—IN VITRO STUDIES FOR INHIBITION OF CROP PATHOGENS (STUDY 2—LIQUID FORMULATION, UNADJUSTED WATER PH)

Further WOB NP 1 and WOB PH 1 products were prepared, according to the general method of Example 1, wherein the sodium benzoate added was is the form of a powder rather than a prill bead of Example 4. These products were subsequently prepared as a liquid formulation according to the method of Example 2.

Water was used unmodified and agars were made up of the 6 products using them at the pH resulting after dissolving to 0.8% concertation. Curative and preventative plates were prepared as described for Example 4 except that pHs were as dissolved (tank water not adjusted prior to dissolving/diluting product).

TABLE 15

Sodium metabisulphite activity on the growth of *E. carotovora* (unadjusted water pH)

| Active | Path | Time | Reps | Curative | Preventative |
|---|---|---|---|---|---|
| Na metabisulphite | *E. carotovora* | 24 hrs | 1 | No obvious effect | No obvious effect |
| | | | 2 | | |
| | | | 3 | | |
| | | 48 hrs | 1 | 1 mm av. reduced growth of cells away from active. | Restricted growth onto agar containing active. Clumping effect just off plug. |
| | | | 2 | | |
| | | | 3 | | |
| | | 7 days | 1 | 3-4 mm av. reduced growth of cells away from active. | Restricted growth onto agar containing active. Clumping effect just off plug. 3-4 mm clumped growth around plug on agar containing active. |
| | | | 2 | | |
| | | | 3 | | |

TABLE 16

Sodium metabisulphite activity on the growth of *B. cinerea* (unadjusted water pH).

| Active | Path | Time | Reps | Curative | Preventative |
|---|---|---|---|---|---|
| Na metabisulphite | *B. cinerea* | 24 hrs | 1 | No obvious effect | No obvious effect |
| | | | 2 | | |
| | | | 3 | | |
| | | 48 hrs | 1 | Hyphae around active looking unhealthy-losing turgor-conidiophores collapsing around active. | No growth off plug into agar containing active. |
| | | | 2 | | |
| | | | 3 | | |

TABLE 16-continued

Sodium metabisulphite activity on the growth of *B. cinerea* (unadjusted water pH).

| | | | | Results | |
|---|---|---|---|---|---|
| Active | Path | Time | Reps | Curative | Preventative |
| | | 7 days | 1 2 3 | No growth onto active discs. Hyphae and conidiophores carrying sporing heads at apex all collapsing out from active. | Kill. No growth off plug into agar or away from agar on plug. Hyphae collapsed and no sporulation on any replicate. |

TABLE 17

Sodium benzoate activity on the growth of *E. carotovora* (unadjusted water pH).

| | | | | Results | |
|---|---|---|---|---|---|
| Active | Path | Time | Reps | Curative | Preventative |
| Na benzoate | *E. carotovora* | 24 hrs | 1 2 3 | No obvious effect | No obvious effect |
| | | 48 hrs | 1 2 3 | No obvious effect | Cells clumped around plug. Piling suggesting move away from active in agar. Vertical rather than linear growth. |
| | | 7 days | 1 2 3 | Reduction in cells numbers around active disc. 3-4 mm reduction zone. | Cells clumped around plug. Piling suggesting move away from active in agar. Vertical rather than linear growth. Growth very restricted. |

TABLE 18

Sodium benzoate activity on the growth of *B. cinerea* (unadjusted water pH).

| | | | | Results | |
|---|---|---|---|---|---|
| Active | Path | Time | Reps | Curative | Preventative |
| Na benzoate | *B. cinerea* | 24 hrs | 1 2 3 | No obvious effect | No obvious effect |
| | | 48 hrs | 1 2 3 | Growth up to but not on disc containing active. | No growth into agar but a little on surface. No sporulation. |
| | | 7 days | 1 2 3 | Growth up to but not on disc containing active. Hyphae unhealthy. Effect less than with Na metabisulphite. | No growth into agar containing active. Effect less than for Na metabisulphite. No sporulation. |

TABLE 19

WOB NP1 (liquid formulation) activity on the growth of *E. carotovora* (unadjusted water pH).

| Active | Path | Time | Reps | Results | |
| --- | --- | --- | --- | --- | --- |
| | | | | Curative | Preventative |
| WOB NP1 | *E. carotovora* | 24 hrs | 1 | No obvious effect | No obvious effect |
| | | | 2 | | |
| | | | 3 | | |
| | | 48 hrs | 1 | No growth onto active discs. | Colonies clumping around plug. |
| | | | 2 | | |
| | | | 3 | Reduced density of cells around active discs. | |
| | | 7 days | 1 | No growth onto active discs. | Colonies clumping around plug. Vertical rather than lateral growth. Growth restricted to 3-4 mm from plug. |
| | | | 2 | | |
| | | | 3 | Reduced density of cells around active discs. | |

TABLE 20

WOB NP1 (liquid formulation) activity on the growth of *E. carotovora* (unadjusted water pH).

| Active | Path | Time | Reps | Results | |
| --- | --- | --- | --- | --- | --- |
| | | | | Curative | Preventative |
| WOB NP1 | *B. cinerea* | 24 hrs | 1 | No obvious effect | No obvious effect |
| | | | 2 | | |
| | | | 3 | | |
| | | 48 hrs | 1 | No growth onto active discs. Hyphae around disc collapsing but not as much as with Na metabisulphite. Sporulation reduced. | No growth onto or in agar containing active. |
| | | | 2 | | |
| | | | 3 | | |
| | | 7 days | 1 | No growth onto active discs. Hyphae around disc collapsing but not as much as with Na metabisulphite. Sporulation reduced. | Kill. No growth onto or in agar containing active. |
| | | | 2 | | |
| | | | 3 | | |

EXAMPLE 6—IN VITRO STUDIES FOR INHIBITION OF CROP PATHOGENS (STUDY 3—STORAGE EFFECTS)

The curative and preventative experiments were repeated according to the method of Example 5 using the liquid WOB NP1 and WOB PH 1 formulations and the solid actives sodium metabisulphite, sodium benzoate and sodium sulphite.

The liquid WOB formulations were divided into 3 aliquots; one was used immediately—time zero; one stored at ambient temperate (15-27° C.) for one week and experiments repeated; one kept refrigerated (5° C.) for one week and experiments repeated. The bottles used for storage of the aliquots did not allow light penetration into the product.

TABLE 21

WOB NP1 dissolved in sterile water and applied at t = 0, activity on the growth of *E. carotovora* (unadjusted water pH).

| Active | Path | Time | Reps | Results Curative | Preventative |
|---|---|---|---|---|---|
| pre WOB NP1 | *E. carotovora* | 24 hrs | 1 | No obvious effect | No obvious effect |
| | | | 2 | | |
| | | | 3 | | |
| | | 48 hrs | 1 | 1 mm av. reduced growth of cells away from active. | No growth off plug. Cells not multiplying. |
| | | | 2 | | |
| | | | 3 | | |
| | | 7 days | 1 | 3-4 mm av. reduced growth of cells away from active. | Kill. Cells under plug in contact with active in agar not multiplying. |
| | | | 2 | | |
| | | | 3 | | |

TABLE 22

WOB NP1 dissolved in sterile water and applied at t = 0, activity on the growth of *B. cinerea* (unadjusted water pH).

| Active | Path | Time | Reps | Results Curative | Preventative |
|---|---|---|---|---|---|
| pre WOB NP1 | *B. cinerea* | 24 hrs | 1 | No obvious effect | No obvious effect |
| | | | 2 | | |
| | | | 3 | | |
| | | 48 hrs | 1 | Hyphae around active looking unhealthy-losing turgor-conidiophores collapsing around active. | No growth off plug into agar containing active. |
| | | | 2 | | |
| | | | 3 | | |
| | | 7 days | 1 | No growth onto active discs. Hyphae and conidiophores carrying sporing heads at apex all collapsing out from active. | Kill. No growth off plug into agar or away from agar on plug. Hyphae collapsed and no sporulation on any replicate. |
| | | | 2 | | |
| | | | 3 | | |

TABLE 23

WOB PH1 dissolved in sterile water and applied at t = 0, activity on the growth of *E. carotovora* (unadjusted water pH).

| Active | Path | Time | Reps | Results Curative | Preventative |
|---|---|---|---|---|---|
| post WOB PH1 | *E. carotovora* | 24 hrs | 1 | No obvious effect | No obvious effect |
| | | | 2 | | |
| | | | 3 | | |
| | | 48 hrs | 1 | Reduced growth of cells away from active. Less effect than WOB pre. | 3-5 mm bacterial growth around plug. Cells clumping. |
| | | | 2 | | |
| | | | 3 | | |
| | | 7 days | 1 | Reduced growth of cells away from active. Less effect than WOB pre. | 3-5 mm bacterial growth around plug. Cells clumping. |
| | | | 2 | | |
| | | | 3 | | |

TABLE 24

WOB PH1 dissolved in sterile water and applied at t = 0, activity on the growth of *B. cinerea* (unadjusted water pH).

| Active | Path | Time | Reps | Results Curative | Preventative |
|---|---|---|---|---|---|
| post WOB PH1 | *B. cinerea* | 24 hrs | 1 | No obvious effect | No obvious effect |
| | | | 2 | | |
| | | | 3 | | |
| | | 48 hrs | 1 | No growth onto discs. More sporulation around active discs than for WOB pre. | Restricted growth onto and into agar containing active. Some sporulation but restricted around plug. |
| | | | 2 | | |
| | | | 3 | | |
| | | 7 days | 1 | No growth onto discs. More sporulation around active discs than for WOB pre. Hyphae collapsing. Conidiophores collapsing. | Some hyphal growth out from plug. Restricted growth but some sporulation around plug. |
| | | | 2 | | |
| | | | 3 | | |

TABLE 25

WOB NP1 dissolved in sterile water and applied at t = 7 days with storage at 5° C., activity on the growth of *E. carotovora* (unadjusted water pH).

| Active | Path | Time | Reps | Results Curative | Preventative |
|---|---|---|---|---|---|
| WOB NP1 | *E. carotovora* | 24 hrs | 1 | No obvious effect | Some growth onto agar containing active. |
| | | | 2 | | |
| | | | 3 | | |
| | | 48 hrs | 1 | Reduced growth of cells away from active. | Restricted growth to around plug. |
| | | | 2 | | |
| | | | 3 | | |
| | | 7 days | 1 | Reduced growth of cells away from active. No obvious difference in growth when compared with Time 0. | Restricted growth to around plug. |
| | | | 2 | | |
| | | | 3 | | |

TABLE 26

WOB NP1 dissolved in sterile water and applied at t = 7 days with storage at 5° C., activity on the growth of *B. cinerea* (unadjusted water pH).

| Active | Path | Time | Reps | Results Curative | Preventative |
|---|---|---|---|---|---|
| WOB NP1 | *B. cinerea* | 24 hrs | 1 | No obvious effect | No obvious effect |
| | | | 2 | | |
| | | | 3 | | |
| | | 48 hrs | 1 | Hyphae around active looking unhealthy-losing turgor-conidiophores collapsing around active. | No growth off plug into agar containing active. |
| | | | 2 | | |
| | | | 3 | | |
| | | 7 days | 1 | No growth onto active discs. Hyphae and conidiophores carrying sporing heads at apex all collapsing out from active. | Kill. No growth off plug into agar or away from agar on plug. |
| | | | 2 | | |
| | | | 3 | | |

TABLE 27

WOB PH1 dissolved in sterile water and applied at t = 7 days with storage at 5° C., activity on the growth of *E. carotovora* (unadjusted water pH).

| Active | Path | Time | Reps | Results Curative | Preventative |
|---|---|---|---|---|---|
| WOB PH1 | *E. carotovora* | 24 hrs | 1 | No obvious effect | No obvious effect |
| | | | 2 | | |
| | | | 3 | | |
| | | 48 hrs | 1 | Reduced growth of cells away from active. Less effect than pre. | Bacterial growth around plug. Cells clumping. |
| | | | 2 | | |
| | | | 3 | | |
| | | 7 days | 1 | Reduced growth of cells away from active. Less effect than pre. | Bacterial growth around plug. Cells clumping. |
| | | | 2 | | |
| | | | 3 | | |

TABLE 28

WOB PH1 dissolved in sterile water and applied at t = 7 days with storage at 5° C., activity on the growth of *B. cinerea* (unadjusted water pH).

| Active | Path | Time | Reps | Results Curative | Preventative |
|---|---|---|---|---|---|
| WOB NP1 | *B. cinerea* | 24 hrs | 1 | No obvious effect. | No obvious effect. |
| | | | 2 | | |
| | | | 3 | | |
| | | 48 hrs | 1 | No growth onto discs. More sporulation around active discs than for pre. | Restricted growth onto and into agar containing active. Some sporulation but restricted around plug. |
| | | | 2 | | |
| | | | 3 | | |
| | | 7 days | 1 | No growth onto discs. More sporulation around active discs than for pre. Hyphae collapsing. Conidiophores collapsing. | Some hyphal growth out from plug. Restricted growth but some sporulation around plug. More hyphae onto agar. |
| | | | 2 | | |
| | | | 3 | | |

TABLE 29

WOB NP1 dissolved in sterile water and applied at t = 7 days with storage at ambient temperature (15-27° C.), activity on the growth of *E. carotovora* (unadjusted water pH).

| Active | Path | Time | Reps | Results Curative | Preventative |
|---|---|---|---|---|---|
| WOB NP1 | *E. carotovora* | 24 hrs | 1 | No obvious effect | Some growth onto agar containing active. |
|  |  |  | 2 |  |  |
|  |  |  | 3 |  |  |
|  |  | 48 hrs | 1 | Reduced growth of cells away from active. Less effect than refrigerated. | Growth onto agar containing active. Little restriction in cell colony formation. |
|  |  |  | 2 |  |  |
|  |  |  | 3 |  |  |
|  |  | 7 days | 1 | Reduced growth of cells away from active. Less effect than refrigerated. | Growth onto agar containing active. Little restriction in cell colony formation. |
|  |  |  | 2 |  |  |
|  |  |  | 3 |  |  |

TABLE 30

WOB NP1 dissolved in sterile water and applied at t = 7 days with storage at ambient temperature (15-27° C.), activity on the growth of *B. cinerea* (unadjusted water pH).

| Active | Path | Time | Reps | Results Curative | Preventative |
|---|---|---|---|---|---|
| WOB NP1 | *B. cinerea* | 24 hrs | 1 | No obvious effect. | No obvious effect. |
|  |  |  | 2 |  |  |
|  |  |  | 3 |  |  |
|  |  | 48 hrs | 1 | Hyphae around active looking unhealthy- losing turgor- conidiophores collapsing around active. | Growth and sporulation out from plug. More hyphae in agar. |
|  |  |  | 2 |  |  |
|  |  |  | 3 |  |  |
|  |  | 7 days | 1 | No growth onto active discs. Hyphae and conidiophores carrying sporing heads at apex all collapsing out from active. | Growth and sporulation out from plug. More hyphae in agar. More growth than 7 days refrigerated. |
|  |  |  | 2 |  |  |
|  |  |  | 3 |  |  |

TABLE 31

WOB PH1 dissolved in sterile water and applied at t = 7 days with storage at ambient temperature (15-27° C.), activity on the growth of *E. carotovora* (unadjusted water pH).

| Active | Path | Time | Reps | Results Curative | Preventative |
|---|---|---|---|---|---|
| WOB NP1 | *E. carotovora* | 24 hrs | 1 | No obvious effect | Growth on agar containing active but restricted to around plugs. |
|  |  |  | 2 |  |  |
|  |  |  | 3 |  |  |
|  |  | 48 hrs | 1 | Reduced growth of cells away from active. Less effect than pre. Less effect than refrigerated. | Growth on agar containing active but restricted to around plugs. |
|  |  |  | 2 |  |  |
|  |  |  | 3 |  |  |
|  |  | 7 days | 1 | Reduced growth of cells away from active. Less effect than pre. | Growth on agar containing active but restricted to around plugs. |
|  |  |  | 2 |  |  |
|  |  |  | 3 |  |  |

TABLE 32

WOB PH1 dissolved in sterile water and applied at t = 7 days with storage at ambient temperature (15-27 °C.), activity on the growth of *B. cinerea* (unadjusted water pH).

| | | | | Results | |
|---|---|---|---|---|---|
| Active | Path | Time | Reps | Curative | Preventative |
| WOB PH1 | *B. cinerea* | 24 hrs | 1 | No obvious effect | No obvious effect. |
| | | | 2 | | |
| | | | 3 | | |
| | | 48 hrs | 1 | No growth onto discs. | Growth |
| | | | 2 | More sporulation around | |
| | | | 3 | active discs than for pre. | |
| | | 7 days | 1 | No growth onto discs. | — |
| | | | 2 | More sporulation around | |
| | | | 3 | active discs than for pre. Hyphae collapsing. Conidiophores collapsing. | |

EXAMPLE 7—IN VITRO STUDIES FOR INHIBITION OF CROP PATHOGENS (STUDY 4-VARIED FUNGAL PATHOGENS)

This trial was set up to determine the efficacy of a formulation comprising WOB-NP1 as a curative against the fungal pathogen, *Botrytis cinerea*, and two bacteria strains, *E. coli* and *Xanthomonas* sp.

The effect of WOB NP1 on two wild type yeasts, *Saccharomyces cerevisae* and *Schizosaccharomyces pombe* were also further investigated.

The organisms were transferred from culture collection mother cultures to fresh media and checked for purity.

Preparation of Test Medium 20 mL of Potato Dextrose Agar (PDA) agar was poured into Petri plates to give the thickness of agar necessary to take 600 μLs of product in each well. *Botrytis cinerea*, *Saccharomyces cerevisae* and *Schizosaccharomyces pombe* were cultured on PDA and grown until sporulating or growing freely across the medium.

Preparation of Products

A formulation was prepared according to the method described in Example 1 (referred to as WOB NP1). Prior to adding formulation to plates, pH readings of the WOB NP1 solutions were taken over a 30 min period to determine stability of the product in solution.

Two identical solutions of WOB-NP1, originating from separate yet identical dry composition batches (WOB-NP1 A and WOB-NP1 B), were produced at 4 g/L (4% v/v) in boiled water.

TABLE 33 pH recordings prior to inoculation.

| Product | Unadjusted pH |
|---|---|
| WOB NP1 A | 5.58 |
| WOB NP1 B | 5.55 |

Preparation of Cell/Spores for Trials:

Sterile boiled water was added to the surface of the *Botrytis cinerea* lawn plates and rubbed gently with sterile hockey sticks to loosen cells (conidia). A known volume—1 mL—of *Botrytis cinerea* conidia or yeast cells was lifted aseptically from the culture plates and dispersed by shaking gently into 9 mL of 1% peptone water. Serial dilutions were carried out until haemocytometer counts showed between $10^3$ and $10^4$ colony forming units (cfus) per mL. Two×300 μLs were added to each of the wells in each plate for the respective organisms. The plates were incubated at 22° C. and observed for reactions between the product and organism at 24 and 10 days. The reaction would be zones of inhibition for the yeast cells or fungal hyphae dying or growing away from the product.

Trials were carried out using direct immersion in product as a curative, using the WOB NP1 formulation A and B, with sterile boiled water as a control tested against *Botrytis cinerea* conidia (spores), *E. coli* and *Xanthomonas* species in triplicate on potato dextrose agar (PDA) and nutrient agar (NA). WOB NP1 A prepared in 2015, just prior to testing in November 2015 and WOB NP1 B prepared two years prior in November 2013, being stored at room temperature in dry conditions until testing.

Exposure time to the products was 5 mins after which 50 μL was applied to each of the replicate plates and spread evenly across the agar surface using sterile disposable hockey sticks.

The plates incubated inverted at 22° C. and counts were read at 48 hours. The above method was followed to make another set of plates where the spores/cells were exposed to the products for 48 hours.

TABLE 34

Qualitative assessment of response of organisms to products WOB NP1 A and WOB NP1 B.

| Exposure time | Organism | WOB NP1 A pH 5.55 | WOB NP1 B pH 5.58 |
|---|---|---|---|
| 5 mins | *Xanthomonas* sp | 50% reduction compared with control | 50-60% reduction when compared with control |
| 48 hours | *Xanthomonas* sp | 100% reduction when compared with control | 100% reduction when compared with control |

TABLE 34-continued

Qualitative assessment of response of organisms to products WOB NP1 A and WOB NP1 B.

| Exposure time | Organism | WOB NP1 A pH 5.55 | WOB NP1 B pH 5.58 |
|---|---|---|---|
| 5 mins | E. coli | No effect | No effect |
| 48 hours | E. coli | 75-80% reduction compared with control | 90% reduction compared with control |
| 5 mins | Botrytis cinerea | No effect | No effect |
| 48 hours | Botrytis cinerea | 100% reduction when compared with control | 100% reduction when compared with control |

EXAMPLE 8—GROWTH STUDIES FOR CONTROL OF BOTRYTIS CINEREA IN GRAPEVINES CV. SAUVIGNON BLANC

A trial was conducted within a commercial vineyard to evaluate WOB NP1 for the control of botrytis (Botrytis cinerea) and for crop safety in grapevines cv. Sauvignon Blanc. A WOB NP1 formulation was prepared according to the method described in Examples 1 and 2. WOB NP1 (comprising active ingredients sodium metabisulphite+sodium benzoate) was applied at 35+119.6, 70+239.2, 140+478.4 and 280+956.8 g ai/100 L and compared with Teldor 500 SC at 50 g ai/100 L and an untreated control.

Materials and Methods

TABLE 35

Products used in the study for control of Botrytis cinerea.

| Product name | Active ingredient(ai) | Concentration of active ingredient | Formulation |
|---|---|---|---|
| WOB NP1 | sodium metabisulphite as sulphur dioxide + sodium benzoate as benzoic acid | 175 g/kg + 598 g/kg | Powder |
| Teldor 500 SC | fenhexamid | 500 g/L | Suspension concentrate |

TABLE 36

Treatment levels and application schedule summary.

| | | Rate | | |
|---|---|---|---|---|
| No. | Product | Product (g or mL/ 100 L) | Active ingredient (g ai/100 L)* | Application schedule |
| 1 | Untreated control | Nil | Nil | N/A |
| 2 | WOB NP1 | 200 g | 35 + 119.6 | A total of six foliar applications to grapevines at 7-26 day intervals commencing at BBCH 61 (10% flowering). Treatments applied as a dilute spray prior to the point of run-off when temperature was below 20° C. and humidity below 70%. |
| 3 | WOB NP1 | 400 g | 70 + 239.2 | |
| 4 | WOB NP1 | 800 g | 140 + 478.4 | |
| 5 | WOB NP1 | 1600 g | 280 + 956.8 | |
| 6 | Teldor 500 SC | 100 mL | 50 | |

*WOB NP1 773 WG formulation containing sodium metabisulphite + sodium benzoate.

Treatments were applied as six dilute foliar sprays just prior to the point of run-off in spray volumes from 700-900 L/ha, commencing at the BBCH 61 (10% flowering) crop stage.

At an assessment conducted three days after application F (3DAAF), although all WOB NP1 treatments appeared to reduce the incidence of botrytis in grapevine bunches, only WOB NP1 at 280+956.8 g ai/100 L had significantly less botrytis than the untreated control. The incidence of botrytis was less in bunches sprayed with Teldor when compared with each of the WOB NP1 treatments (Table 40).

At 3DAAF, the severity of botrytis was significantly less in all WOB NP1 treatments when compared with an untreated control. Disease severity in bunches sprayed with WOB NP1 at 70+239.2 and 280+956.8 g ai/100 L was also statistically comparable with Teldor (Table 40).

At 15DAAB, WOB NP1 at 70+239.2, 140+478.4 and 280+956.8 g ai/100 L caused some phototoxicity to grapevine leaves but phytotoxicity was absent in grape bunches. Necrotic spotting was observed on leaves sprayed with WOB NP1 at 70+239.2, 140+478.4 and 280+956.8 g ai/100 L with the most severe damage at the highest rate of WOB NP1 (Table 41, FIGS. 1-5b).

TABLE 37

Outlining the chronology of events stages of application of the WOB NP-1 formulation on the grape vine test subjects.

| Days after application timing (DAA#) | BBCH scale | Description | Event |
|---|---|---|---|
| 0DAAA | 61 | 10% flowering | Application A |
| 7DAAA | 68 | 80% flowering | Application B |
| 15DAAB | 75 | Berries pea size | Crop safety photographs taken Crop safety assessment |
| 24DAAB | 77 | Berries beginning to touch | Application C Crop safety assessment |
| 26DAAC | 81 | Veraison | Application D Crop safety assessment |
| 21DAAD | 83 | Berries softening | Application E Crop safety assessment |
| 12DAAE | 83 | Berries softening | Application F Crop safety assessment |
| 3DAAF | 83 | Berries softening | Botrytis assessment Crop safety assessment |

Application Details—Spray

Table 38 and 39 describe details of the application spray and conditions at each time point throughout the application schedule.

TABLE 38

Outlining specifics of the application spray and conditions at application time points A, B and C.

| Application equipment | |
|---|---|
| Method | Dilute foliar application just prior to the point of run-off |
| Equipment | Motorised backpack sprayer with hand-held lance |
| Nozzle type | Spraying Systems TG-3 full cone |
| Nozzle number and spacing | 1 |
| Spray quality | Medium |
| Spray volume (L/ha) | 700-900 |
| Pressure (kPa) | 500 |

| Treatment applications | | | |
|---|---|---|---|
| Application timing | A | B | C |
| Days after application timing | 0DAAA | 7DAAA | 24DAAB |
| Times | 08:30-09:45 | 10:45-12:00 | 08:45-10:00 |
| Treatments applied | 2-6 | 2-6 | 2-6 |
| Spray volume (L/ha) | 700 | 700 | 900 |
| Temperature (° C.) | 15 | 18 | 17 |
| Relative humidity (%) | 67 | 59 | 63 |
| Cloud cover (%) | 100 | 10 | 80 |
| Wind direction | NE | Variable | NW |
| Wind speed (kph) | 5-10 | 0-3 | 0-5 |
| Leaf wetness | Nil | Nil | Nil |
| Disease level | Nil | Nil | Nil |
| Crop stage description | 10% flowering | 80% flowering | Berries beginning to touch |
| Crop stage (BBCH) | 61 | 68 | 77 |

TABLE 39

Outlining specifics of the application spray and conditions at application time points D, E and F.

| Application equipment | |
|---|---|
| Method | Dilute foliar application just prior to the point of run-off |
| Equipment | Motorised backpack sprayer with hand-held lance |
| Nozzle type | Spraying Systems TG-3 full cone |
| Nozzle number and spacing | 1 |
| Spray quality | Medium |
| Spray volume (L/ha) | 900 |
| Pressure (kPa) | 500 |

| Treatment applications | | | |
|---|---|---|---|
| Application timing | D | E | F |
| Days after application timing | 26DAAC | 21DAAD | 12DAAE |
| Times | 11:30-13:00 | 08:30-09:30 | 10:00-11:15 |
| Treatments applied | 2-6 | 2-6 | 2-6 |
| Spray volume (L/ha) | 900 | 900 | 900 |
| Temperature (° C.) | 14 | 19 | 21 |
| Relative humidity (%) | 52 | 55 | 47 |
| Cloud cover (%) | 40 | 100 | 20 |
| Wind direction | W | NW | W |
| Wind speed (kph) | 5-10 | 0-5 | 10-12 |
| Leaf wetness | Nil | Nil | Nil |
| Disease level | Nil | Nil | *Botrytis* present |
| Crop stage description | Veraison | Berries softening | Berries softening |
| Crop stage (BBCH) | 81 | 83 | 83 |

Results

TABLE 40

Botrytis incidence and severity at three days after application F (3DAAF)

| | | | Botrytis control on grapevine bunches 3DAAF | |
|---|---|---|---|---|
| No. | Treatment | Rate (g ai/100 L)* | Incidence (% bunches affected) | Severity (% bunch area affected) |
| 1 | Untreated control | Nil | 41 a | 6.9 a |
| 2 | WOB NP1 | 35 + 119.6 | 34 ab | 4.0 b |
| 3 | WOB NP1 | 70 + 239.2 | 29 ab | 2.3 bc |
| 4 | WOB NP1 | 140 + 478.4 | 33 ab | 3.1 b |
| 5 | WOB NP1 | 280 + 956.8 | 24 b | 2.8 bc |
| | P-value | | 0.0034 | 0.0009 |
| | LSD (P ≤ 0.05) | | 13.1 | 2.23 |

*WOB NP1 formulation containing sodium metabisulphite + sodium benzoate. Means followed by the same letter are not significantly different (P = 0.05, LSD)
DAA# = Days after application timing

TABLE 41

Grapevine bunch crop safety

| | | Rate (g ai/ | Grapevine bunch crop safety (% bunch area affected by phytotoxic symptoms) | | | | |
|---|---|---|---|---|---|---|---|
| No. | Treatment | 100 L)* | 15DAAB | 24-DAAB | 26DAAC | 21DAAD | 3DAAF |
| 1 | Untreated control | Nil | 0 | 0 | 0 | 0 | 0 |
| 2 | WOB NP1 | 35 + 119.6 | 0 | 0 | 0 | 0 | 0 |
| 3 | WOB NP1 | 70 + 239.2 | 0 | 0 | 0 | 0 | 0 |
| 4 | WOB NP1 | 140 + 478.4 | 0 | 0 | 0 | 0 | 0 |
| 5 | WOB NP1 | 280 + 956.8 | 0 | 0 | 0 | 0 | 0 |
| 6 | Teldor 500 SC | 50 | 0 | 0 | 0 | 0 | 0 |
| | P-value | | 1.0000 | 1.0000 | 1.0000 | 1.0000 | 1.0000 |
| | LSD (P ≤ 0.05) | | NSD | NSD | NSD | NSD | NSD |

*WOB NP1 formulation containing sodium metabisulphite + sodium benzoate.
DAA# = Days after application timing
NSD = No significant difference due to a P-value > 0.05

TABLE 42

Describes the methods used to assess the crops including methods of statistical analysis for results observed. *Botrytis* assessment

| | |
|---|---|
| Days after application timing | 3DAAF |
| Sample size | 40 bunches per plot |
| Method | Percent area affected by *botrytis* (*Botrytis cinerea*) from 40 grape bunches per plot was visually estimated with results presented as mean percent bunch area affected. Incidence was calculated in ARM2018 from severity data collected. |

Crop safety assessment-grape bunches

| | |
|---|---|
| Daysafter application timing | 15DAAB  24DAAB  26DAAC  21DAAD  3DAAF |
| Sample size | Whole plot (4 vines) |
| Method | All grape bunches were visually assessed for symptoms of phytotoxicity including, but not limited to discolouration, necrosis or developmental effects. |

TABLE 42-continued

Describes the methods used to assess the crops including methods of statistical analysis for results observed. *Botrytis* assessment

| | |
|---|---|
| Statistical analysis | Analysis of variance (ANOVA) test and Fisher's least significant difference (LSD) test were conducted using ARM2018. When data violated the assumptions of ANOVA (homogeneity of variance and normality) data correction transformations were conducted. Original plot means are presented in Results tables with analysis of variance and letters of separation from transformed data. Note, treatment data with the same number but different letters of separation can result from statistics relying on transformed data. |

TABLE 43

Botrytis incidence and severity at three days after application F (3DAAF)

| | | | | | | | | |
|---|---|---|---|---|---|---|---|---|
| Pest Name | | | | Botrytis | | Botrytis | | |
| Part Rated | | | | BUNCH P | | BUNCH P | | |
| Rating Type | | | | PESINC | | PESSEV | | |
| Rating Unit | | | | % | | % AREA | | |
| Sample Size, Unit | | | | 40 BUNCH | | 40 BUNCH | | |
| Reporting Basis, Unit | | | | 1 PLOT | | 1 BUNCH | | |
| Trt-Eval Interval | | | | 3DAAF | | 3DAAF | | |
| Trt No. | Trt. Name | Rate* | Rate Unit | 1 | | 2 | | |
| 1 | Untreated control | | | 41 | a | 6.9 | a | |
| 2 | WOB NP1 | 35 + 119.6 | g ai/100 L | 34 | ab | 4.0 | b | |
| 3 | WOB NP1 | 70 + 239.2 | g ai/100 L | 29 | ab | 2.3 | bc | |
| 4 | WOB NP1 | 140 + 478.4 | g ai/100 L | 33 | ab | 3.1 | b | |
| 5 | WOB NP1 | 280 + 956.8 | g ai/100 L | 24 | b | 2.8 | bc | |
| 6 | Teldor 500 SC | 50 | g ai/100 L | 11 | c | 0.8 | c | |
| LSD (P = .05) | | | | 13.1 | | 2.23 | | |
| Standard Deviation | | | | 8.7 | | 1.48 | | |
| CV | | | | 30.26 | | 44.44 | | |
| Bartlett's X2 | | | | 2.213 | | 1.187 | | |
| P(Bartlett's X2) | | | | 0.819 | | 0.946 | | |
| Skewness | | | | −0.6714 | | 0.6929 | | |
| Kurtosis | | | | 0.0788 | | 0.0161 | | |
| Replicate F | | | | 0.752 | | 1.018 | | |
| Replicate Prob(F) | | | | 0.5379 | | 0.4122 | | |
| Treatment F | | | | 5.862 | | 7.662 | | |
| Treatment Prob(F) | | | | 0.0034 | | 0.0009 | | |

*WOB NP1 formulation containing sodium meta bisulphite + sodium benzoate. Means followed by same letter do not significantly differ (P = .05, LSC >) Mean comparisons performed only when AOV Treatment P(F) is significant at mean comparison OSL Part Rated
 BUNCH=bunch
 P=Pest is Part Rated
Rating Type
 PESINC=pest incidence
 PESSEV=pest severity
Rating Unit
 %=percent
 % AREA=percent of area
 BUNCH=bunch
 PLOT=total plot

TABLE 44

Grapevine bunch crop safety profile

| | | | | | | | | |
|---|---|---|---|---|---|---|---|---|
| Pest Name | | | | | | | | |
| Part Rated | | | | BUNCH C | | | | |
| Rating Type | | | | PHYGEN | | | | |
| Rating Unit | | | | % AREA | | | | |
| Sample Size, Unit | | | | 4 VINE | | | | |
| Reporting Basis, Unit | | | | 1 PLOT | | | | |
| Trt-Eval Interval | | | | 15DAAB | 24DAAB | 26DAAC | 21DAAD | 3DAAF |
| Trt No. | Trt. Name | Other Rate* | Other Rate Unit | 3 | 4 | 5 | 6 | 7 |
| 1 | Untreated control | | | 0a | 0a | 0a | 0a | 0a |
| 2 | WOB NP1 | 35 + 119.6 | g ai/100 L | 0a | 0a | 0a | 0a | 0a |
| | WOB NP1 | 70 + 239.2 | g ai/100 L | 0a | 0a | 0a | 0a | 0a |
| 4 | WOB NP1 | 140 + 478.4 | g ai/100 L | 0a | 0a | 0a | 0a | 0a |
| 5 | WOB NP1 | 280 + 956.8 | g ai/100 L | 0a | 0a | 0a | 0a | 0a |
| 6 | Teldor 500 SC | 50 | g ai/100 L | 0a | 0a | 0a | 0a | 0a |
| LSD P = .05 | | | | — | — | — | — | — |
| Standard Deviation | | | | 0.0 | 0.0 | 0.0 | 0.0 | 0.0 |
| CV | | | | 0.0 | 0.0 | 0.0 | 0.0 | 0.0 |
| Bartlett's X2 | | | | 0.00 | 0.00 | 0.00 | 0.00 | 0.00 |

TABLE 44-continued

| Grapevine bunch crop safety profile | | | | | |
|---|---|---|---|---|---|
| P(Bartlett's X2) | — | — | — | — | — |
| Skewness | — | — | — | — | — |
| Kurtosis | — | — | — | — | — |
| Replicate F | 0.000 | 0.000 | 0.000 | 0.000 | 0.000 |
| Replicate Prob(F) | 1.0000 | 1.0000 | 1.0000 | 1.0000 | 1.0000 |
| Treatment F | 0.000 | 0.000 | 0.000 | 0.000 | 0.000 |
| Treatment Prob(F) | 1.0000 | 1.0000 | 1.0000 | 1.0000 | 1.0000 |

*WOB NP1 formulation containing sodium metabisulphite + sodium benzoate formulation Means followed by same letter or symbol do not significantly differ (P = .05, LSD) Mean comparisons performed only when AOV Treatment P(F) is significant at mean comparison OSL Could not calculate LSD (% mean diff) for columns 3, 4, 5, 6, 7 because error mean square = 0

Part Assessed
  BUNCH=bunch
  C=Crop is Part Rated
Assessment Type
  PHYGEN=phytotoxicity—general/injury
Assessment Unit
  % AREA=percent of area
  VINE=vine PLOT=total plot

TABLE 45

Botrytis incidence and severity at three days after application F (3DAAF)

| Pest Name | | | | | Botrytis | Botrytis |
|---|---|---|---|---|---|---|
| Part Rated | | | | | BUNCH P | BUNCH P |
| Rating Type | | | | | PESINC | PESSEV |
| Rating Unit | | | | | % | % AREA |
| Sample Size, Unit | | | | | 40 BUNCH | 40 BUNCH |
| Reporting Basis, Unit | | | | | 1 PLOT | 1 BUNCH |
| Trt-Eval Interval | | | | | 3DAAF | 3DAAF |
| Trt No. | Treatment Name | Rate* | Rate Unit | Plot | 1 | 2 |
| 1 | Untreated control | | | 102 | 45 | 8.1 |
| | | | | 204 | 50 | 8.2 |
| | | | | 301 | 35 | 4.0 |
| | | | | 405 | 35 | 7.4 |
| | Mean = | | | | 41 | 6.9 |
| 2 | WOB NP1 | 35 + 119.6 | g ai/100 L | 101 | 28 | 3.0 |
| | | | | 206 | 35 | 2.9 |
| | | | | 304 | 38 | 6.0 |
| | | | | 402 | 38 | 4.3 |
| | Mean = | | | | 34 | 4.0 |
| 3 | WOB NP1 | 70 + 239.2 | g ai/100 L | 104 | 38 | 2.3 |
| | | | | 202 | 35 | 4.5 |
| | | | | 306 | 23 | 1.4 |
| | | | | 401 | 20 | 1.3 |
| | Mean = | | | | 29 | 2.3 |
| 4 | WOB NP1 | 140 + 478.4 | g ai/100 L | 103 | 25 | 2.9 |
| | | | | 205 | 40 | 4.7 |
| | | | | 302 | 28 | 1.7 |
| | | | | 406 | 40 | 3.3 |
| | Mean = | | | | 33 | 3.1 |
| 5 | WOB NP1 | 280 + 956.8 | g ai/100 L | 106 | 8 | 0.6 |
| | | | | 201 | 30 | 3.4 |
| | | | | 303 | 25 | 3.1 |
| | | | | 404 | 35 | 4.0 |
| | Mean = | | | | 24 | 2.8 |
| 6 | Teldor 500 SC | 50 | g ai/100 L | 105 | 8 | 0.2 |
| | | | | 203 | 0 | 0.0 |
| | | | | 305 | 18 | 0.7 |
| | | | | 403 | 18 | 2.4 |
| | Mean = | | | | 11 | 0.8 |

**WOB NP1 formulation containing sodium metabisulphite + sodium benzoate.

Part Rated
  BUNCH=bunch
  P=Pest is Part Rated
Rating Type
  PESINC=pest incidence
  PESSEV=pest severity
Rating Unit
  %=percent
  % AREA=percent of area
  BUNCH=bunch
  PLOT=total plot

TABLE 46

Meteorological details (part 1 of 2) throughout study period.

Location: Low Head, Tasmania, Australia

| Day | Event | Min °C. | Max °C. | mm* | Event | Min °C. | Max °C. | mm* |
|---|---|---|---|---|---|---|---|---|
| 1 |  | 19.0 | 19.7 | 0 |  | 15.8 | 20.6 | 0 |
| 2 |  | 13.8 | 17.3 | 13.0 |  | 14.8 | 19.9 | 0 |
| 3 |  | 8.8 | 15.9 | 28.0 |  | 12.4 | 20.0 | 0 |
| 4 |  | 10.0 | 18.3 | 0.2 |  | 14.6 | 19.8 | 0 |
| 5 | Treat | 10.7 | 17.3 | 0 | Treat Assess | 12.5 | 21.8 | 0 |
| 6 |  | 11.5 | 20.8 | 0 |  | 14.4 | 20.6 | 0 |
| 7 |  | 12.9 | 19.3 | 0 |  | 15.6 | 22.3 | 0 |
| 8 |  | 11.9 | 18.7 | 0 |  | 15.2 | 20.6 | 0 |
| 9 |  | 14.1 | 20.1 | 2.4 |  | 15.8 | 20.5 | 0 |
| 10 |  | 15.2 | 19.7 | 0 |  | 12.9 | 20.3 | 2.2 |
| 11 |  | 14.6 | 21.0 | 0 |  | 14.0 | 21.4 | 0 |
| 12 | Treat | 13.1 | 21.1 | 0 |  | 18.8 | 20.8 | 0 |
| 13 |  | 14.8 | 21.2 | 0 |  | 13.7 | 20.3 | 5.2 |
| 14 |  | 16.9 | 20.8 | 0 |  | 10.4 | 21.6 | 0.2 |
| 15 |  | 13.4 | 19.5 | 0 |  | 13.8 | 27.3 | 0 |
| 16 |  | 15.4 | 20.4 | 0 |  | 12.5 | 20.7 | 0 |
| 17 |  | 11.0 | 19.4 | 0 |  | 15.1 | 21.6 | 0 |
| 18 |  | 15.2 | 22.4 | 0 |  | 14.3 | 21.6 | 0 |
| 19 |  | 16.9 | 21.8 | 0 |  | 15.9 | 24.6 | 0 |
| 20 |  | 16.7 | 19.5 | 4.8 |  | 16.9 | 21.7 | 0 |
| 21 |  | 14.0 | 19.4 | 0 |  | 16.3 | 21.8 | 0.4 |
| 22 |  | 15.4 | 20.6 | 0 |  | 18.9 | 22.8 | 0 |
| 23 |  | 15.7 | 19.8 | 0.8 |  | 15.8 | 22.1 | 0 |
| 24 |  | 13.4 | 18.9 | 0 |  | 16.2 |  |  |
| 25 |  | 11.2 | 20.1 | 0 |  | 16.1 | 23.7 | 0 |
| 26 |  | 12.4 | 20.6 | 0 |  | 15.3 | 23.8 | 0 |
| 27 | Photos Assess | 15.5 | 21.2 | 0 |  | 18.3 | 24.1 | 0 |
| 28 |  | 18.3 | 23.0 | 4.8 |  | 21.2 | 25.2 | 0 |
| 29 |  | 16.7 | 19.3 | 0 |  | 21.4 | 23.5 | 0 |
| 30 |  | 15.3 | 18.7 | 1.8 |  | 15.1 | 22.4 | 11.4 |
| 31 |  | 14.2 | 19.2 | 0 | Treat Assess | 11.2 | 20.8 | 0 |
| Total |  |  |  | 55.8 |  |  |  | 19.4 |

*mm = recorded rainfall at the corresponding time point.

TABLE 47

Meteorological details (part 2 of 2) throughout study period.

Location: Low Head, Tasmania, Australia

| Day | Event | Min °C. | Max °C. | mm* | Event | Min °C. | Max °C. | mm* |
|---|---|---|---|---|---|---|---|---|
| 1 |  | 10.9 | 20.2 | 0 |  | 14.8 | 23.7 | 0 |
| 2 |  | 13.4 | 21.0 | 0 |  | 14.9 | 21.0 | 0 |
| 3 |  | 16.2 | 22.6 | 0 |  | 14.3 | 21.2 | 0 |
| 4 |  | 17.8 | 22.8 | 0 |  | 14.5 | 20.4 | 0 |
| 5 |  | 15.8 | 21.5 | 0 | Treat | 12.0 | 21.0 | 0 |
| 6 |  | 17.3 | 21.9 | 0 |  | 12.5 | 21.1 | 0 |
| 7 |  | 15.8 | 23.2 | 0 |  | 12.6 | 20.6 | 0 |
| 8 |  | 19.4 | 25.9 | 0 | Assess | 13.2 | 21.6 | 0 |
| 9 |  | 18.9 | 23.0 | 0 |  | 14.2 | 22.6 | 0 |
| 10 |  | 20.2 | 22.1 | 0 |  | 14.4 | 22.9 | 0 |
| 11 |  | 16.8 | 21.7 | 3.4 |  | 16.2 | 24.1 | 0 |
| 12 |  | 13.2 | 21.8 | 0 |  | 14.8 | 20.2 | 0 |
| 13 |  | 11.3 | 21.3 | 0 |  | 15.5 | 21.7 | 0 |

TABLE 47-continued

Meteorological details (part 2 of 2) throughout study period.

Location: Low Head, Tasmania, Australia

| Day | Event | Min °C. | Max °C. | mm* | Event | Min °C. | Max °C. | mm* |
|---|---|---|---|---|---|---|---|---|
| 14 |  | 15.6 | 17.9 | 6.0 |  | 14.6 | 21.1 | 0 |
| 15 |  | 13.8 | 19.0 | 3.2 |  | 15.0 | 19.6 | 0 |
| 16 |  | 13.9 | 19.3 | 1.4 |  | 12.9 | 19.2 | 1.0 |
| 17 |  | 14.7 | 19.6 | 0 |  | 14.0 | 23.4 | 2.2 |
| 18 |  | 16.3 | 20.4 | 0 |  | 17.3 | 18.2 | 11.8 |
| 19 |  | 13.6 | 22.7 | 0 |  | 12.9 | 19.1 | 10.0 |
| 20 |  | 10.6 | 19.4 | 0 |  | 12.1 | 18.4 | 0.6 |
| 21 | Treat Assess | 13.0 | 19.6 | 0 |  | 9.2 | 18.5 | 0 |
| 22 |  | 13.4 | 21.3 | 0 |  | 11.1 | 18.9 | 0 |
| 23 |  | 16.5 | 19.7 | 0 |  | 15.0 | 19.2 | 0 |
| 24 |  | 18.2 | 22.7 | 22.0 |  | 16.5 | 19.0 | 0 |
| 25 |  | 11.3 | 20.7 | 0.4 |  | 14.4 | 18.5 | 23.6 |
| 26 |  | 11.9 | 19.3 | 0 |  | 12.1 | 18.9 | 13.6 |
| 27 |  | 12.2 | 21.1 | 0 |  | 12.5 | 18.1 | 0.2 |
| 28 |  | 15.3 | 21.0 | 0 |  | 13.0 | 21.0 | 0 |
| 29 |  |  |  |  |  | 15.1 | 19.3 | 0.2 |
| 30 |  |  |  |  |  | 15.7 | 18.2 | 4.6 |
| 31 |  |  |  |  |  | 11.3 | 17.6 | 0 |
| Total |  |  |  | 36.4 |  |  |  | 67.8 |

*mm = recorded rainfal at the corresponding time point

EXAMPLE 9—GROWTH CONTROL OF *BOTRYTIS CINEREA* IN GRAPEVINES CV. CABERNET SAUVIGNON

Formulations comprising sodium metabisulphite and sodium benzoate (WOB NP1 773 WG) were applied as dilute canopy sprays to grapevines cv. Cabernet Sauvignon for the control of grey mould (*Botrytis cinerea*). WOB NP1 773 WG was applied at 30% capfall, the end of flowering, when berries were 4 mm, during bunch closure and at veraison. The standard grey mould control program of Teldor 500 SC applied at end of flowering followed by Switch 625 WG when berries were 4 mm diameter was used for comparison.

Crop safety was assessed during flowering, at fruit set, just prior to bunch closure, at early and late veraison and just prior to harvest. WOB NP1 caused necrosis and browning of the leaf margins, with the area damaged increasing significantly with rate and with subsequent applications. The lower rate of WOB NP1 showed up to 28% of leaves damaged with a severity of 0.3% LAD (leaf area damaged), whilst the high rate showed 100% of the leaves damaged with up to 10.9% LAD. No visible damage was seen on bunches, however higher rates of WOB NP1 left residues on bunches.

The test site was chosen as all fruit from the previous season was rejected due to high levels of grey mould. Grey mould was first seen in the untreated control ten days after commercial harvest, when 8.7% of bunches were damaged by grey mould at a severity index of 2.2%. No grey mould was observed in any treatment, providing no dose response to WOB NP1 rates. All rates of WOB NP1 were equivalent to the standard spray program for the control of grey mould.

TABLE 48

Products employed in the study for growth control of *Botrytis cinerea* in grapevines cv. Cabernet Sauvignon

| Product name | Active ingredient (ai) | Concentration of active ingredient | Formulation |
|---|---|---|---|
| WOB NP1 773 WG | sodium metabisulphite as sulphur dioxide + sodium benzoate as benzoic acid | 175 g/kg + 598 g/kg | Water dispersible granule |
| Teldor 500 SC | fenhexamid | 500 g/L | Suspension concentrate |
| Switch 625 WG | fludioxonil + cyprodinil | 250 g/kg + 375 g/kg + | Water dispersible granule |

TABLE 49

Treatment schedule employed in the growth control of *Botrytis cinerea* study.

| | | Rate | | |
|---|---|---|---|---|
| No. | Product | Product (mL or g/100 L) | Active ingredient* (g ai/100 L) | Application schedule |
| 1 | Untreated control | Nil | Nil | N/A |
| 2 | WOB NP1 773 WG | 200 g | 35.0 + 119.6 | Applied at 30% capfall (A), end of flowering (B), 4 mm berries (C), bunch closure (D) and veraison (E) |
| 3 | WOB NP1 773 WG | 400 g | 70.0 + 239.2 | |
| 4 | WOB NP1 773 WG | 800 g | 140.0 + 478.4 | |
| 5 | WOB NP1 773 WG | 1600 g | 280.0 + 956.8 | |
| 6 | Teldor 500 SC | 100 mL | 50.0 | End of flowering (B) |
| | Switch 625 WG | 80 g | 20.0 + 30.0 | 4 mm berries (C) |

*WOB NP1 773 WG formulation containing sodium metabisulphite + sodium benzoate.

TABLE 50

Chronology of events throughout the growth control of *Botrytis cinerea* study.

| Days after budburst (DAB) | Spray interval (days) | Crop stage Modified E-L scale | Description | Event |
|---|---|---|---|---|
| 0 | — | 04 | Budburst | Budburst |
| 51 | — | 17-18 | Pre-flowering | Prosper 500 EC + Avatar 300 WG (Powdery mildew + garden weevil control) |
| 73 | — | 21 | 30% capfall | Vivando 500 SC (Powdery mildew control) |
| 74 | — | 21 | 30% capfall | Application A |
| 80 | — | 24 | 60% capfall | Crop phytotoxicity assessment |
| 85 | — | 26 | End of flowering | Vivando 500 SC + Revus 250 SC (Powdery mildew + downy mildew control) |
| 86 | 12 | 26 | End of flowering | Application B |
| 93 | — | 27 | Beginning of fruit set | Applaud 440 SC (Mealy bug control) Crop phytotoxicity assessment |
| 99 | 13 | 29 | 4 mm berries | Application C |
| 100 | — | 29 | 4 mm berries | Talendo 200 EC (Powdery mildew control) |
| 114 | — | 31 | 7 mm berries | Crop phytotoxicity assessment |
| 129 | 30 | 33 | Bunch closure | Application D |
| 156 | 27 | 36 | Veraison-colour change 90% | Crop phytotoxicity assessment Application E |
| 190 | — | 37 | Berries not quite ripe | Crop phytotoxicity assessment Grey mould bunch assessment |
| 204 | — | 38 | Berries harvest ripe | Crop phytotoxicity assessment Grey mould bunch assessment |
| 214 | — | 39 | Berries over ripe | Grey mould bunch assessment |

Results

TABLE 51

Crop safety-bunch damage

| | | Rate 100 L)* | Application | Mean bunch area damaged (%) | | | | | |
|---|---|---|---|---|---|---|---|---|---|
| No. | Treatment | (g ai/ | schedule | 80DAB | 93 DAB | 114DAB | 156DAB | 190DAB | 204DAB |
| 1 | Untreated control | Nil | Nil | 0.0 | 0.0 | 0.0 | 0.0 | 0.0 | 0.0 |
| 2 | WOB NP1 773 WG | 35.0 + 119.6 | ABCDE | 0.0 | 0.0 | 0.0 | 0.0 | 0.0 | 0.0 |
| 3 | WOB NP1 773 WG | 70.0 + 239.2 | ABCDE | 0.0 | 0.0 | 0.0 | 0.0 | 0.0 | 0.0 |

TABLE 51-continued

Crop safety-bunch damage

| No. | Treatment | Rate 100 L)* (g ai/ | Application schedule | Mean bunch area damaged (%) | | | | | |
|---|---|---|---|---|---|---|---|---|---|
| | | | | 80DAB | 93 DAB | 114DAB | 156DAB | 190DAB | 204DAB |
| 4 | WOB NP1 773 WG | 140.0 + 478.4 | ABCDE | 0.0 | 0.0 | 0.0 | 0.0 | 0.0 | 0.0 |
| 5 | WOB NP1 773 WG | 280.0 + 956.8 | ABCDE | 0.0 | 0.0 | 0.0 | 0.0 | 0.0 | 0.0 |
| 6 | Teldor 500 SC Switch 625 WG | 50 20 + 30 | B C | 0.0 | 0.0 | 0.0 | 0.0 | 0.0 | 0.0 |
| | P-value | | | 1.0000 | 1.0000 | 1.0000 | 1.0000 | 1.0000 | 1.0000 |
| | LSD (P < 0.05) | | | NSD | NSD | NSD | NSD | NSD | NSD |

**WOB NP1 773 WG formulation containing sodium metabisulphite + sodium benzoate.
DAB = Days after budburst
NSD = No significant difference due to a p-value > 0.05

TABLE 52

Crop safety-leaf necrosis incidence

| No. | Treatment | Rate (g ai/ 100 L)* | App. schedule | Mean leaf necrosis incidence (% of leaves damaged) | | | | | |
|---|---|---|---|---|---|---|---|---|---|
| | | | | 80DAB | 93DAB | 114DAB | 156DAB | 190DAB | 204DAB |
| 1 | Untreated control | Nil | Nil | 0.0 c | 0.0 e | 0.0 d | 0.0 d | 0.0 d | 0.0 c |
| 2 | WOB NP1 773 WG | 35.0 + 119.6 | ABCDE | 0.0 c | 25.0 d | 28.0 c | 19.2 c | 0.0 d | 0.0 c |
| 3 | WOB NP1 773 WG | 70.0 + 239.2 | ABCDE | 11.0 c | 59.0 c | 65.0 b | 55.0 b | 36.0 c | 0.0 c |
| 4 | WOB NP1 773 WG | 140.0 + 478.4 | ABCDE | 54.0 b | 86.0 b | 99.0 a | 93.0 a | 79.0 b | 70.0 b |
| 5 | WOB NP1 773 WG | 280.0 + 956.8 | ABCDE | 95.0 a | 99.0 a | 100 a | 93.0 a | 95.0 a | 87.0 a |
| 6 | Teldor 500 SC Switch 625 WG | 50 20 + 30 | B C | 0.0 c | 0.0 e | 3.0 d | 9.0 c | 0.0 d | 0.0 c |
| | P-value | | | 0.0001 | 0.0001 | 0.0001 | 0.0001 | 0.0001 | 0.0001 |
| | LSD (P ≤ 0.05) | | | 11.45 | tA | tA | tA | tA | tA |

*WOB NP1 773 WG formulation containing sodium metabisulphite + sodium benzoate.
DAB = Days after budburst
Means followed by the same letter are not significantly different (p = 0.05, LSD).
tA = Original plot means are presented with analysis of variance and letters of separation from data transformed using y = Arcsine square root percent (x)

TABLE 53

Crop safety-leaf necrosis severity

| No. | Treatment | Rate (g ai/ 100 L)* | App. schedule | Mean leaf necrosis severity (% leaf area damaged) | | | | | |
|---|---|---|---|---|---|---|---|---|---|
| | | | | 80DAB | 93DAB | 114DAB | 156DAB | 190DAB | 204DAB |
| 1 | Untreated control | Nil | Nil | 0.0 c | 0.0 e | 0.0 e | 0.0 d | 0.0 c | 0.0 c |
| 2 | WOB NP1 773 WG | 35.0 + 119.6 | ABCDE | 0.0 c | 0.3 d | 0.3 d | 0.2 cd | 0.0 c | 0.0 c |
| 3 | WOB NP1 773 WG | 70.0 + 239.2 | ABCDE | 0.1 c | 0.8 c | 0.8 c | 0.7 c | 0.7 c | 0.0 c |
| 4 | WOB NP1 773 WG | 140.0 + 478.4 | ABCDE | 0.6 b | 1.4 b | 2.0 b | 2.6 b | 5.3 b | 1.6 b |
| 5 | WOB NP1 773 WG | 280.0 + 956.8 | ABCDE | 1.6 a | 3.3 a | 4.4 a | 6.8 a | 10.9 a | 4.4 a |

TABLE 53-continued

Crop safety-leaf necrosis severity

| | | | Mean leaf necrosis severity (% leaf area damaged) | | | | | |
|---|---|---|---|---|---|---|---|---|
| No. | Treatment | Rate (g ai/ 100 L)* | App. schedule | 80DAB | 93DAB | 114DAB | 156DAB | 190DAB | 204DAB |
| 6 | Teldor 500 SC Switch 625 WG | 50 20 + 30 | B C | 0.0 c | 0.0 e | 0.0 e | 0.1 d | 0.0 c | 0.0 c |
| | P-value | | | 0.0001 | 0.0001 | 0.0001 | 0.001 | 0.0001 | 0.0001 |
| | LSD (P ≤ 0.05) | | | tA | tA | tL | tL | tL | tS |

*WOB NP1 773 WG formulation containing sodium metabisulphite + sodium benzoate.
DAB = Days after budburst
Means followed by the same letter are not significantly different (p = 0.05, LSD).
tL = Original plot means are presented with analysis of variance and letters of separation from data transformed using y = Log (x + 1)
tS = Original plot means are presented with analysis of variance and letters of separation from data transformed using y = SQRT (x + 0.5)
tA = Original plot means are presented with analysis of variance and letters of separation from data transformed using y = Arcsine square root percent (x)

TABLE 54

Grey mould incidence and severity-Berries not quite ripe

| | | | | Mean grey mould bunch damage-Berries not quite ripe 190DAB | |
|---|---|---|---|---|---|
| No. | Treatment | Rate (g ai/100 L)* | Application schedule | Incidence (%) | Severity index (%) |
| 1 | Untreated control | Nil | Nil | 0.0 | 0.0 |
| 2 | WOB NP1773 WG | 35.0 + 119.6 | ABCDE | 0.0 | 0.0 |
| 3 | WOB NP1773 WG | 70.0 + 239.2 | ABCDE | 0.0 | 0.0 |
| 4 | WOB NP1773 WG | 140.0 + 478.4 | ABCDE | 0.0 | 0.0 |
| 5 | WOB NP1773 WG | 280.0 + 956.8 | ABCDE | 0.0 | 0.0 |
| 6 | Teldor 500 SC Switch 625 WG | 50 20 + 30 | B C | 0.0 | 0.0 |
| | P-value | | | 1.0000 | 1.0000 |
| | LSD (P ≤ 0.05) | | | NSD | NSD |

*WOB NP1 773 WG formulation containing sodium metabisulphite + sodium benzoate.
DAB = Days after budburst
Damage severity index (%) = Σ (Frequency × damage rating) × 100/[total # (eg. 100) × max. rating (i.e. 10)]
NSD = No significant difference due to a p-value > 0.05

TABLE 55

Grey mould incidence and severity-Harvest ripe

| | | | | Mean grey mould bunch damage-Harvest ripe 204DAB | |
|---|---|---|---|---|---|
| No. | Treatment | Rate (g ai/100 L)* | Application schedule | Incidence (%) | Severity index (%) |
| 1 | Untreated control | Nil | Nil | 0.0 | 0.0 |
| 2 | WOB NP1 773 WG | 35.0 + 119.6 | ABCDE | 0.0 | 0.0 |
| 3 | WOB NP1 773 WG | 70.0 + 239.2 | ABCDE | 0.0 | 0.0 |
| 4 | WOB NP1 773 WG | 140.0 + 478.4 | ABCDE | 0.0 | 0.0 |
| 5 | WOB NP1 773 WG | 280.0 + 956.8 | ABCDE | 0.0 | 0.0 |
| 6 | Teldor 500 SC Switch 625 WG | 50 20 + 30 | B C | 0.0 | 0.0 |
| | P-value | | | 1.0000 | 1.0000 |
| | LSD (P ≤ 0.05) | | | NSD | NSD |

*WOB NP1 773 WG formulation containing sodium metabisulphite + sodium benzoate.
DAB = Days after budburst
Means followed by the same letter are not significantly different (p = 0.05, LSD)
Damage severity index (%) = Σ (Frequency × damage rating) × 100/[total # (eg. 100) × max. rating (i.e. 10)]

TABLE 56

Grey mould incidence and severity-Berries overripe

| No. | Treatment | Rate (g ai/100 L)* | Application schedule | Mean grey mould bunch damage-Berries overripe 214DAB Incidence (%) | Severity index (%) |
|---|---|---|---|---|---|
| 1 | Untreated control | Nil | Nil | 8.7 a | 2.2 a |
| 2 | WOB NP1 773 WG | 35.0 + 119.6 | ABCDE | 0.0 b | 0.0 b |
| 3 | WOB NP1 773 WG | 70.0 + 239.2 | ABCDE | 0.0 b | 0.0 b |
| 4 | WOB NP1 773 WG | 140.0 + 478.4 | ABCDE | 0.0 b | 0.0 b |
| 5 | WOB NP1 773 WG | 280.0 + 956.8 | ABCDE | 0.0 b | 0.0 b |
| 6 | Teldor 500 SC | 50 | B | 0.0 b | 0.0 b |
|   | Switch 625 WG | 20 + 30 | C | | |
|   | P-value | | | 0.0107 | 0.0205 |
|   | LSD (P ≤ 0.05) | | | 5.21 | 1.40 |

*WOB NP1 773 WG formulation containing sodium metabisulphite + sodium benzoate.
DAB = Days after budburst

EXAMPLE 10—GROWTH CONTROL OF PATHOGENS ON CHERRIES, CV. REGINA

WOB NP1 at 200, 400 and 800 g/100 L was applied in a five spray program commencing at early flowering for the control of bacterial spot (*Xanthomonas campestris*) and brown rot (*Monilinia fructicola*) and penicillin mould (*Penicillium* spp.) in cherries cv. Regina. These treatments were compared with an industry standard program including Bavistin 500 SC at 50 ml/100 L, Polyram 700 OF and Tilt 250 SC applied on three occasions during flowering only, an industry standard program followed by two applications of WOB NP1 at rates of 200, 400 or 800 g/100 L prior to harvest and an untreated control. All sprayed treatments were applied as dilute sprays to the point of run-off.

TABLE 57

Treatment protocol

| No. | Treatment | Product | Application Timing |
|---|---|---|---|
| 1 | Untreated control | Nil | Nil |
| 2 | WOB NP1 (Full program) | 200 g | 10% flowering: –WOB NP1 |
| 3 | WOB NP1 (Full program) | 400 g | 50% flowering: –WOB NP1 |
| 4 | WOB NP1 (Full program) | 800 g | Petal fall: –WOB NP1 |
|   |   |   | 1 & 5 days prior to harvest: –WOB NP1 |
| 5 | Standard program: |   | Standard program + WOB NP1 |
|   | Bavistin 500 SC 50 ml | 50 mL | 10% Flowering: –Tilt 250 EC + Polyram 700 |
|   | Polyram 700 DF | 150 g | OF |
|   | Tilt 250 EC + | 25 mL + | 50% Flowering: –Tilt 250 EC + Polyram 700 |
|   | WOB NP1 | 200 g | DF |
| 6 | Bavistin 500 SC 50 ml | 50 mL | Petal fall: –Bavistin 500 SC + 5 days |
|   | Polyram 700 DF | 150 g | and 1 day prior to harvest: –WOB NP1 |
|   | Tilt 250 EC + | 25 mL + | |
|   | WOB NP1 | 400 g | |
| 7 | Bavistin 500 SC 50 ml | 50 mL | |
|   | Polyram 700 DF | 150 g | |
|   | Tilt 250 EC + | 25 mL + | |
|   | WOB NP1 | 800 g | |
| 8 | Bavistin 500 SC 50 ml | 50 mL | Standard program |
|   | Polyram 700 DF | 150 g | 10% Flowering: –Tilt 250 EC + Polyram 700 |
|   | Tilt 250 EC | 25 mL | OF |
|   |   |   | 50% Flowering: –Tilt 250 EC + Polyram 700 |
|   |   |   | DF |
|   |   |   | Petal fall: –Bavistin 500 SC |

TABLE 58

Chronology of Events

| Days after application number (DAA#) Days after harvest (DAH) | Crop Stage | Event |
|---|---|---|
| 0DAA1 | 20% flowering | Treatment 1 |
| 3DAA1 | 50% flowering | Treatment 2 |
| 14DAA1 | 11 DAA2 | Petal fall | Treatment 3 |
| 94DAA 1, 91 DAA2, 80DAA3 | Colouring advanced | Treatment 4 |
| 99DAA 1, 96DAA2 85DAA3, 5DAA4 | Fruit mature | Treatment 5 |
| 100DAA1, 97DAA2, 86DAA3, 6DAA4, 1 DAA5 | Harvest | Harvest Assessment |
| 22DAH | Post harvest | Post harvest assessment |

TABLE 59

Mean percentage of healthy green fruit stalk and post harvest *penicillin* mould infections twenty two days after harvest (22DAH).

| No. | Treatment | Product (mL or g/100 L) | Mean % healthy green stalk (22DAH*) | Mean % cherries infected with *Penicillium* spp. (22DAH*) |
|---|---|---|---|---|
| 1 | Untreated control | Nil | 21 | 4 |
| 2 | WOB NP1 (Full program) | 200 g | 46 | 6 |
| 3 | WOB NP1 (Full program) | 400 g | 39 | 6 |
| 4 | WOB NP1 (Full program) | 800 g | 41 | 6 |
| 5 | Standard program: Bavistin 500 SC 50 ml Polyram 700 DF Tilt 250 EC + WOB NP1 | 50 mL 150 g 25 mL + 200 g | 36 | 2 |
| 6 | Bavistin 500 SC 50 ml Polyram 700 DF Tilt 250 EC + WOB NP1 | 50 mL 150 g 25 mL + 400 g | 52 | 0 |
| 7 | Bavistin 500 SC 50 ml Polyram 700 DF Tilt 250 EC + WOB NP1 | 50 mL 150 g 25 mL + 800 g | 43 | 2 |
| 8 | Bavistin 500 SC 50 ml Polyram 700 DF Tilt 250 EC | 50 mL 150 g 25 mL | 45 | 0 |

*DAH-Days after harvest.

EXAMPLE 11—POST HARVEST TREATMENT FOR GROWTH CONTROL OF PATHOGENS ON CHERRIES, CV. REGINA

Fruit obtained from the studies discussed in Example 6 were also used to evaluate WOB NP1 at 400, 240 and 160 g/100 L when used as a post harvest treatment. The use of WOB NP1 as a post harvest wash was investigated using both WOB NP1 and the industry standard program as a pre-harvest wash, as discussed in Example 6.

TABLE 60

Post harvest treatment product information

| Product name | Active ingredient (ai) | Concentration of active ingredient | Formulation |
|---|---|---|---|
| WOB NP1 | WOB NP1 | 500 g/kg | Wettable Powder |
| WOB NP2 | WOB NP2 | 700 g/kg | Wettable Powder |
| WOB NP3 | WOB NP3 | 250 g/kg | Wettable Powder |

TABLE 61

Treatment protocol

| No. | Treatment | Product | Application Timing |
|---|---|---|---|
| 1 | Untreated control | Nil | Nil |
| 2 | Untreated control + WOB NP1 (Post Harvest Dip) | Nil 400 g | Untreated control + Post Harvest Dip: –WOB NP1 |
| 3 | WOB NP1 | 400 g | Full WOB NP1 program: 10% flowering: –WOB NP1 50% flowering: –WOB NP1 Petal fall: –WOB NP1 + 1 & 5 days prior to harvest: –WOB NP1 |
| 4 | WOB NP1 + WOB NP1 (Post Harvest Dip) | 400 g + 400 g | Full WOB NP1 program + 1 & 5 days prior to harvest: –WOB NP1 + Post harvest dip: –WOB NP1 |
| 5 | Standard program: Bavistin 500 SC Polyram 700 DF Tilt 250 EC | 50 mL 150 g 25 mL | Grower Standard Program: 10% flowering: –Polyram 700 DF + Tilt 250 EC 50% flowering: –Polyram 700 DF + Tilt 250 EC Petal fall: –Bavistin 500 SC |
| 6 | Standard program: Bavistin 500 SC 50 ml Polyram 700 DF Tilt 250 EC + WOB NP1 | 50 mL 150 g 25 mL + 400 g | Grower Standard program + 5 days and 1 day prior to harvest: –WOB NP1 |

TABLE 61-continued

Treatment protocol

| No. | Treatment | Product | Application Timing |
|---|---|---|---|
| 7 | Standard program:<br>Bavistin 500 SC 50 ml<br>Polyram 700 DF<br>Tilt 250 EC +<br>WOB NP1 +<br>WOB NP1<br>(Post Harvest Dip) | 50 mL<br>150 g<br>25 mL +<br>400 g +<br>400 g | Grower Standard program + 1 &<br>5 days prior to harvest: –WOB NP1 +<br>Post harvest dip: –WOB NP1 |
| 8 | Standard program:<br>Bavistin 500 SC 50 ml<br>Polyram 700 DF<br>Tilt 250 EC +<br>WOB NP2 +<br>WOB NP1<br>(Post Harvest Dip) | 50 mL<br>150 g<br>25 mL +<br>120 g +<br>400 g | Grower Standard program + 1 &<br>5 days prior to harvest: –WOB NP1 +<br>Post harvest dip: –WOB NP1 |
| 9 | Untreated control + WOB NP3 (Post Harvest Dip) | Nil +<br>160 g | Untreated control +<br>Post Harvest Dip: –WOB NP3 |
| 10 | WOB NP1 +<br>WOB NP3<br>(Post Harvest Dip) | 400 g +<br>160 g | Full WOB NP1 program: + 1 &<br>5 days prior to harvest: –WOB NP1 +<br>Post harvest dip: –WOB NP3 |
| 11 | Standard program:<br>Bavistin 500 SC 50 ml<br>Polyram 700 DF<br>Tilt 250 EC +<br>WOB NP2 +<br>WOB NP3<br>(Post Harvest Dip) | 50 mL<br>150 g<br>25 mL +<br>120 g +<br>160 g | Grower Standard program + 1 &<br>5 days prior to harvest: –WOB NP2 +<br>Post harvest dip: –WOB NP3 |
| 12 | WOB NP1 +<br>WOB NP2<br>(Post Harvest Dip) | +400 g +<br>240 g | Full WOB NP1 program + 1 &<br>5 days prior to harvest: –WOB NP1 +<br>Post harvest dip: –WOB NP2 |

TABLE 62

Chronology of Events

| Days after application number (DAA#) Days after harvest (DAH) | Crop Stage | Event |
|---|---|---|
| 0DAA1 | 20% flowering | Treatment 1 |
| 3DAA1 | 50% flowering | Treatment 2 |
| 14DAA1 \| 11 DAA2 | Petal fall | Treatment 3 |
| 94DAA 1, 91 DAA2, 80DAA3 | Colouring advanced | Treatment 4 |
| 99DAA 1, 96DAA2 85DAA3, 5DAA4 | Fruit mature | Treatment 5 |
| 100DAA1, 97DAA2, 86DAA3, 6DAA4, 1 DAA5 | Harvest | Harvest Assessment |
| 7DAH | Post harvest | Photographs |
| 16DAH | Post harvest | Photographs |
| 22DAH | Post harvest | Post harvest assessment |

TABLE 63

Mean percentage of healthy green fruit stalk and post harvest penicillin mould infections twenty two days after harvest (22DAH)

| | Sprayed applications | | Post Harvest dip application | | Mean % healthy green stalk (22DAH*) | Mean % cherries infected with *Penicillium* (22DAH*) |
|---|---|---|---|---|---|---|
| No. | Treatments | Product rate (g or mL/100 L) | Treatments | Product rate (g or mL/100 L) | | |
| 1 | Untreated control | Nil | Nil | Nil | 21 | 4 |
| 2 | Untreated control | Nil | WOB NP1 | 400 g | 52 | 2 |
| 3 | WOB NP1 (full program) | 400 g | Nil | Nil | 38.8 | 4 |
| 4 | WOB NP1 (full program) | 400 g | WOB NP1 | 400 g | 60 | 2 |

TABLE 63-continued

Mean percentage of healthy green fruit stalk and post harvest penicillin mould infections twenty two days after harvest (22DAH)

| No. | Sprayed applications Treatments | Product rate (g or mL/100 L) | Post Harvest dip application Treatments | Product rate (g or mL/100 L) | Mean % healthy green stalk (22DAH*) | Mean % cherries infected with *Penicillium* (22DAH*) |
|---|---|---|---|---|---|---|
| 5 | Grower Program: Bavistin 500 SC Polyram 700 DF Tilt 250 EC | 50 mL 150 g 25 mL | Nil | Nil | 45 | 0 |
| 6 | Grower Program: Bavistin 500 SC Polyram 700 DF Tilt 250 EC + WOB NP1 | 50 mL 150 g 25 mL + 400 g | Nil | Nil | 52 | 0 |
| 7 | Grower Program: Bavistin 500 SC Polyram 700 DF Tilt 250 EC + WOB NP1 | 50 mL 150 g 25 mL + 400 g | WOB NP1 | 400 g | 42 | 6 |
| 8 | Grower Program: Bavistin 500 SC Polyram 700 DF Tilt 250 EC + WOB NP2 | 50 mL 150 g 25 mL + 120 g | WOB NP1 | 400 g | 42 | 6 |
| 9 | Untreated control | Nil | WOB NP3 | 160 | 56 | 0 |
| 10 | WOB NP1 (full program) | 400 g | WOB NP3 | 160 | 59 | 2 |
| 11 | Grower Program: Bavistin 500 SC Polyram 700 DF Tilt 250 EC + WOB NP2 | 50 mL 150 g 25 mL + 120 g | WOB NP3 | 160 | 51 | 2 |
| 12 | WOB NP1 (full program) | 400 g | WOB NP2 | 240 | 48.4 | 2 |

*DAH-Days after harvest.

EXAMPLE 12—EFFICACY OF WOB NP1 AND BCDMH ON APPLES AND PEARS

Studies performed to determine pathogen growth inhibition by WOB NP1, a formulation comprising the active ingredients sodium metabisulphite and sodium benzoate, and BCDMH a formulation comprising the active ingredient Bromochloro dimethyl hydantoin and a process where fruit where dipped with WOBNP1, BCDMH+WOBNP1+BCDMH.

Eight replicates of apples cv Jonagold and pears cv Beurre Bosc were used for each treatment. The fruit were contained in 36 litre plastic produce crates stacked on pallets in groups of 8.

The fruit had previously been washed and stored at 0° C. in air for approximately 4 months. Before the trial the fruit were wounded slightly by tipping once from one crate into another. Any fruit with rots or other disorders were removed at this time.

The fruit were inoculated with *Penicillium expansum* and a mixture of 4 strains of *E. coli*. Inoculation was achieved by dipping each crate of fruit in a 100l tank of inoculum suspension. Separate tanks were used for apples and pears and the concentration of inoculum determined before and after dipping. The apple inoculum contained an average of $5.7 \times 10^3$ cfu/ml of *P. expansum* and $1.81 \times 10^6$ cfu/ml of *E. coli*. The Pear inoculum contained an average of $4.8 \times 10^3$ cfu/ml *P. expansum* and $2.09 \times 10^6$ cfu/ml of *E. coli*.

Fruit were then allowed to dry overnight at 0° C. Prior to treatment a sample of fruit was taken (unwashed control). Four apples or pears were selected from 4 different crates on each pallet and stored at 0° C. in sealed plastic bags.

Each batch of fruit was drenched for a contact time of 2 minutes then allowed to drain at room temperature for 2 hours before returning to storage at 0° C.

After drying overnight a sub-sample of 4 fruit was removed from each of 4 replicates of each treatment. These were stored in sealed plastic bags at 0° C. Microbiological testing was carried out the same day.

Microbiological testing was done on a bulked 25 g sample taken from 4 fruit for each replicate. Each 25 g sample was added to 250 ml of sterile 0.1% neutralized bacteriological peptone (pH 7.0-7.4) and stomached for 2 minutes. One ml of stomached samples was plated onto *E. coli*/coliform and Yeast and Mould Petrifilm plates (3M Microbiology Products) and incubated at 37° C. and 20° C. respectively before assessing, according to the manufacturer's instructions.

Following the drenching treatment and 24 hours drying pallets were stacked in groups of 2 and wrapped in plastic film to maintain high humidity. They were stored at 0° C. for approximately 3 months. Including the previous storage there was a total storage time of 7 months. Fruit were removed from cold storage on 9/10 (pears) and 12/10 (apples) and placed in a 21° C. room for 3 days (pears) or 3.5 days (apples) to allow rots to develop before assessing. Fruit were assessed visually and scored for the occurrence of *Penicillium* rots and "other" rots.

TABLE 64

SUMMARY MICROBIOLOGICAL PRODUCE TESTS

| Sample | Yeast and Mould (CFU/g) | Faecal Conforms (CFU/g) * | E.coli (CFU/g) * |
|---|---|---|---|
| Apples-Unwashed | 9872 | 0 | 784 |
| Apples-Water | 8297 | 0 | 176 |
| Apples-WOB NP1 | 5819 | 0 | 145 |
| Apples-BCDMH | 4593 | 0 | 162 |
| Apples-BCDMH + WOB NP1 | 3363 | 0 | 23 |
| Pears-Unwashed | 1880 | 0 | 31 |
| Pears-Water | 1626 | 0 | 19 |
| Pears-WOB NP1 | 113 | 0 | 0 |
| Pears-BCDMH | 302 | 0 | 0 |
| Pears-BCDMH WOB NP1 | 21 | 0 | 0 |

* Average of 4 replicates

TABLE 65

SUMMARY OF POST-STORAGE ROT ASSESSMENTS

| Sample | Penicillium (Average % Incidence) * | Other rots (Average % Incidence) * | Total rots (Average % Incidence) * |
|---|---|---|---|
| Apples-Water | 30.8 | 2.3 | 33.1 |
| Apples-WOB NP1 | 18.6 | 2.4 | 21.0 |
| Apples-BCDMH | 24.3 | 1.6 | 25.8 |
| Apples-BCDMH + WOB NP1 | 18.2 | 2.2 | 20.4 |
| Pears-Water | 25.8 | 15.8 | 41.6 |
| Pears-WOB NP1 | 14.9 | 10.1 | 25.0 |
| Pears-BCDMH | 19.0 | 16.2 | 35.2 |
| Pears-BCDMH + WOB NP1 | 15.7 | 12.4 | 28.1 |

* Average of 8 replicates

Results

Results were analyzed by Analysis of Variance using GenStat for Windows 11th Edition (Lawes Agricultural Trust, IACR-Rothamsted) and significance determined using LSDs at the 5% level.

Microbiological Tests

Pears

For pears WOB NP1 (formulation comprising sodium metabisulphite and sodium benzoate, WOB NP1) and BCDMH (formulation comprising the active ingredient BromoChloroDimethylHydantoin)+WOB NP1 significantly reduced the level of contamination by fungi compared to the unwashed sample while BCDMH and water did not (FIG. 9). There were no significant differences in the levels of fungi between WOB NP1 and BCDMH+WOB NP1, or between BCDMH and water (FIG. 9).

Three treatments (WOB NP1, BCDMH and BCDMH+WOB NP1) reduced the levels of E. coli on pears to zero. There was no significant difference between water and unwashed (FIG. 10).

Apples

For apples only the BCDMH+WOB NP1 treatment significantly reduced the level of contamination by fungi compared to the unwashed sample (FIG. 11). There were no significant differences in the levels of fungi or E. coli between any of the treatments (FIGS. 11 and 12). Bozul, BCDMH+WOB NP1 or water significantly reduced the level of contamination with E. coli compared to the unwashed treatment (FIG. 12).

Post Storage Rot Assessments

Pears

For pears, all sanitizer treatments were significantly better than water in reducing Penicillium rots. For "other" rots only WOB NP1 was significantly better than water, while for "total" rots only WOB NP1 or WOB NP1 plus BCDMH were better (FIG. 13).

Apples

WOB NP1 and WOB NP1+BCDMH were significantly better at reducing Penicillium rots and "total" rots on apples than washing with just water, while BCDMH was not significantly different to water. Other rots were at very low incidences in all treatments (FIG. 14).

EXAMPLE 13—RESIDUE STUDY

This study was conducted to determine the presence and persistence of sulfur dioxide and benzoic acid residues in wine grapes and processed commodities (wine, juice and pomace) following six applications of WOB NP1 (prepared according to the method of Example 1 and 2).

The wine grapes to be treated as treatment 2 received six applications of WOB NP1 at a nominal rate of 212.8 g a.i./100 L sodium metabisulphite (equivalent to 140 g a.i./100 L sulfur dioxide) and 478.4 g a.i./100 L sodium benzoate; the actual application rates were 230.4 g a.i./100 L sodium metabisulphite (equivalent to 155.3 g a.i./100 L sulfur dioxide) and 513.6 g a.i./100 L sodium benzoate.

The wine grapes to be treated as treatment 3 received six applications of WOB NP1 at a nominal rate of 425.6 g a.i./100 L sodium metabisulphite (equivalent to 280 g a.i./100 L sulfur dioxide) and 956.8 g a.i./100 L sodium benzoate; the actual application rates were 460.8 g a.i./100 L sodium metabisulphite (equivalent to 310.6 g a.i./100 L sulfur dioxide) and 1027.2 g a.i./100 L sodium benzoate.

TABLE 66

Treatment table.

| Treatment Number | Test item | Rate of Test Item (g/100 L) | Rate of Active (g a.i./100 L) | Application Timing |
|---|---|---|---|---|
| T1 | Untreated Control | Nil | Nil | N/A |
| T2 | WOB NP1 | 800 | 212.8 (140) Sodium Metabisulphite[1] + 478.4 Sodium Benzoate | A B C D E F |

TABLE 66-continued

Treatment table.

| Treatment Number | Test item | Rate of Test Item (g/100 L) | Rate of Active (g a.i./100 L) | Application Timing | | | | | |
|---|---|---|---|---|---|---|---|---|---|
| T3 | WOB NP1 | 1600 | 425.6 (280) Sodium Metabisulphite[1] + 956.8 Sodium Benzoate | A | B | C | D | E | F |

N/A = Not applicable
Note
[1]Nominal and actual rates of active are sodium metabisulphite with results in brackets indicating the equivalent of sulfur dioxide.
Application A: 5% capfall;
Application B: 80% capfall
Application C: pre bunch closure
Application D: pre bunch closure to veraison
Application E: Veraison
Application F: 2 days before commercial harvest

TABLE 67

Test site 1 (Tasmania)

| Trt. | Formulated Test Substance | Active Ingredient | Rates of Test Substance (g/100 L) | Nominal Rates of Active (g a.i./100 L) | Actual Rates of Active (g a.i./100 L) | | | | | |
|---|---|---|---|---|---|---|---|---|---|---|
| | | | | | A | B | C | D | E | F |
| T1 | Untreated Control | Nil | Nil | Nil | — | — | — | — | — | — |
| T2 | WOB NP1 | Sodium Metabisulphite | 800 | 212.8 (140)[2] | 230.4 (155.3) | 230.4 (155.3) | 230.4 (155.3) | 230.4 (155.3) | 230.4 (155.3) | 230.4 (155.3) |
| | | Sodium Benzoate | | 478.4 | 513.6 | 513.6 | 513.6 | 513.6 | 513.6 | 513.6 |
| T3 | WOB NP1 | Sodium Metabisulphite | 1600 | 425.6 (280)[3] | 460.8 (310.6) | 460.8 (310.6) | 460.8 (310.6) | 460.8 (310.6) | 460.8 (310.6) | 460.8 (310.6) |
| | | Sodium Benzoale | | 956.8 | 1027.2 | 1027.2 | 1027.2 | 1027.2 | 1027.2 | 1027.2 |

Note
[1]Rates are corrected for the concentration show on the Certificate of Analysis.
Note
[2]Nominal and actual rates of active are sodium metabisulphite with results in brackets indicating the equivalent of sulfur dioxide.
Comment-Actual rates applied were within 10.9% of the nominated rates.

TABLE 68

Test site 2 (Western Australia)

| Trt. | Formulated Test Substance | Active Ingredient | Rates of Test Substance (g/100 L) | Nominal Rates of Active (g a.i./100 L) | Actual Rates of Active (g a.i./100 L) | | | | | |
|---|---|---|---|---|---|---|---|---|---|---|
| | | | | | A | B | C | D | E | F |
| T1 | Untreated Control | Nil | Nil | Nil | — | — | — | — | — | — |
| T2 | WOB NP1 | Sodium Metabisulphite | 800 | 212.8 (140)[2] | 230.4 (155.3) | 230.4 (155.3) | 230.4 (155.2) | 230.4 (155.3) | 230.4 (155.3) | 230.4 (155.3) |
| | | Sodium Benzoate | | 478.4 | 513.6 | 513.6 | 513.6 | 513.6 | 513.6 | 513.6 |
| T3 | WOB NP1 | Sodium Metabisulphite | 1600 | 425.6 (280)[2] | 460.8 (310.6) | 460.8 (310.6) | 460.8 (310.6) | 460.8 (310.6) | 460.8 (310.6) | 460.8 (310 6) |
| | | Sodium Benzoate | | 956.8 | 1027.2 | 1027.2 | 1027.2 | 1027.2 | 1027.2 | 1027.2 |

Note
[1]Rates are corrected for the concentration shown on the Certificate of Analysis.
Note
[2]Nominal and actual rates of active are sodium metabisulphite with results in brackets indicating the equivalent of sulfur dioxide.
Comment-Actual rates applied were within 10.9% of the nominated rates.

A minimum of 1 kg of grape bunches were sampled for residue samples from the treated plots at 0, 1, 2 and 3 days after last application (DALA). 2 DALA coincided with normal commercial harvest (NCH). Samples from the untreated control were collected at 2 DALA (NCH) to coincide with sampling from the treated plots.

A minimum of 5 kg of grape bunches were sampled for processing samples from the treated plots at 0, 1, 2 and 3 days after last application (DALA). 2 DALA coincided with normal commercial harvest (NCH). Samples from the untreated control were collected at 2 DALA (NCH) to coincide with sampling from the treated plots. These were for processing into wine, juice and pomace.

The analytical phase of the study was conducted by The Australian Wine Research Institute (AWRI) at their Urrbrae, South Australia facilities. Frozen samples of grapes were processed in accordance with AWRI SOP6—Preparation of fresh, frozen and dried fruit and vegetables and plant materials, and Vinification of fresh and frozen grapes. Samples of juice, wine and pomace were stored frozen prior to analysis or analysed within 14 days of generation. Samples were prepared and analysed as outlined below.

Grape study samples were analysed as whole commodity without caps and stems. Samples were partially defrosted and prepared as per AWRI SOP6—Preparation of fresh, frozen and dried fruit and vegetables and plant material. Approximately 500 g of berries were subsampled from all bunches in the sample and added to a Retsch Grindmix and homogenised for twenty seconds. Processing study samples were subsampled to generate an approximately 1 kg and 800 g subsamples of grapes for juicing and/or vinification respectively.

Vinification subsamples were thawed overnight then manually crushed and the must added to a 1 L glass fermentation vessel to which approximately 50 mg/L sulfur dioxide, as potassium metabisulphite, and 200 mg/L diammonium phosphate solution was added. The must was then inoculated with rehydrated active dried wine yeast, AWRI 796, and fermented on skins at 25° C., with daily mixing of the skin and liquid. After 7 days, the ferment was pressed twice, each time at approx. 19 Nm for 2 minutes, with mixing of the marc between pressings.

The wine was returned to the original vessel and allowed to ferment to dryness (<1 g/L residual sugar) at 25° C. Once fermentation was established as complete using CInitest strips and the wine were racked from the gross lees and a 200 mL subsample taken and stored at approx. 4° C. prior to analysis. The wine study samples were centrifuged prior to analysis to improve clarification.

Juice and pomace samples were generated by thawing the samples overnight then pressing the grapes at 19 Nm for two minutes, missing and repeating the processing. Juicing samples were taken. The pomace samples were taken for analysis and moisture content determination.

Pomace was subsampled and added to a Retsch Grindomix and homogenised for twenty (20) seconds or until the sample was considered homogenous. A subsample of homogenate was taken for analysis and a further 250 g taken as a backup.

Juice and wine study sample were analysed with no further preparation.

Analytical Method—Benzoic Acid

The analytical procedure used for determination of benzoic acid in the wine, juice and pomace study samples was performed using liquid chromatography with tandem mass spectrometry (LC/MS/MS). For grape and juice samples, a 15 g subsample of a sample homogenate was weighed into a 50 mL centrifuge and 0.05 mL of surrogate standard solution (12.5 µg/mL d5-atrazine) added. 15 mL of acetonitrile (1% acetic acid) was added and the tube shaken for approx. 2 minutes then cooled in a laboratory freezer for 15 minutes. Magnesium sulphate (6 g) and sodium acetate (1.5 g) was added with 2 glass beads and the sample shaken for a further 1 minute.

The extract was centrifuged and a 6 mL aliquot of supernatant was taken and added to a 15 mL dispersive solid-phase extraction (dSPE) tube containing 400 mg primary-secondary amine and 1200 mg magnesium sulphate. The sample tube was shaken for 1 minute then centrifuged.

A 0.2 mL aliquot of the supernatant was added to a 2 mL amber vial and diluted with 0.8 mL 25% methanol/0.005% formic acid/0.01% EDTA solution and mixed. The final extract was then analysed using an Agilent 1290 liquid chromatography (LC) with a 6460A tandem mass spectrometer (MS/MS).

For pomace samples, 3 g sample was taken and rehydrated with 12 mL of MilliQ water prior to extraction as above, except the dSPE tube contained 400 mg primary-secondary amine, 400 mg C18 and 1200 mg magnesium sulphate.

For wine samples a 15 mL aliquot of wine was taken and the procedure as outlined for grape study samples followed with the exception that a 1 mL aliquot was taken from the centrifuged dSPE tube and evaporated to dryness in a TurboVap then reconstituted using 0.1 mL methanol, vortexed and 0.1 mL 25% methanol/0.005% formic acid/0.01% EDTA solution. The final extract was added to a 2 mL amber vial containing a 0.3 mL insert then analysed using an Agilent 1290 liquid chromatograph (LC) with a 6460A tandem mass spectrometer (MS/MS).

Analytical Methods—Sulfur Dioxide

The free sulfur determination is based on the reaction between free sulfur in an acidic medium with a mixture of pararosanline and formaldehyde to give a pink colour which is measured at 575 nm. The method requires two tests to be analysed concurrently, one with pyruvic acid (FSO2A) and one without (FSO2B). A third method (FSO2C) is sued to determine the solpe (m). The free SO2 is calculated by the following formula:

$$FSO2 = m(FSO2A - FSO2B) - \text{Blank}$$

The total sulfur determination is performed by diluting with pH 8 buffer, stabilizing, then taking a zero measurement. DTNB reagent is then added, which reacts with a free sulfhydryl group to yield a mixed disulphide and 2-nitro-5-thiobenzoic acid product. This yellow product is measured at 412 nm.

All samples, both wine and juice (including grape and pomace as juice), were centrifuged at 3500 rpm for 5 minutes prior to analysis, and were analysed as close to room temperature as possible. Samples volume of 7 mL of each sample was sued for analysis.

Tabulated below is a summary of residue results applicable for the harvest interval range for wine grapes treated with the formulation under test. Results are reported in mg/kg, or less than the limit of quantification (<LoQ) or limit of detection (<LoD) as appropriate.

Benzoic acid results for 'dry weight' are based on a calculation using residue results from the 'wet weight' then adjusted for the moisture content of the sample. Benzoic acid results reported as <LoD and <LoQ for 'dry weight' are based entirely on the calculated 'wet weight' result.

TABLE 69

The residual benzoic acid and sulfur dioxide remaining in grapes at study site 1

| Site | Sample Type | Specimen sample code | Treatment number | Test Item | Rate of Test Item (g/100 L) | Test sample timing (DALA[1]) | AWRI Sample ID | Total SO$_2$ (mg/L) | Benzoic Acid (mg/kg) |
|---|---|---|---|---|---|---|---|---|---|
| 1 | Grapes | WOB17483-FB001-FB | T1 | Untreated control | Nil | 2 | AE51697 | <3 | <LoD |
| | | WOB17483-FB002-FB | T2 | WOB NP1 | 800 | 0 | AE51698 | <3 | 3.507 |
| | | WOB17483-FB003-FB | T2 | WOB NP1 | 800 | 1 | AE51699 | <3 | 4.471 |
| | | WOB17483-FB004-FB | T2 | WOB NP1 | 800 | 2 | AE51700 | <3 | 1.090 |
| | | WOB17483-FB005-FB | T2 | WOB NP1 | 800 | 3 | AE51701 | <3 | 1.351 |
| | | WOB17483-FB006-FB | T3 | WOB NP1 | 1600 | 0 | AE51702 | <3 | 9.670 |
| | | WOB17483-FB006-FB | T3 | WOB NP1 | 1600 | 0 | AE51702D | <3 | 10.476 |
| | | WOB17483-FB007-FB | T3 | WOB NP1 | 1600 | 1 | AE51703 | <3 | 9.992 |
| | | WOB17483-FB008-FB | T3 | WOB NP1 | 1600 | 2 | AE51704 | <3 | 5.289 |
| | | WOB17483-FB009-FB | T3 | WOB NP1 | 1600 | 3 | AE51705 | <3 | 4.456 |

[1]DALA days after last application
*D denotes duplicate
LoD: limit of detection (0.100 mg/kg)
LoQ: limit of quantitation (0.200 mg/kg)

TABLE 70

The residual benzoic acid and sulfur dioxide remaining in grapes at study site 2

| Site | Sample Type | Specimen sample code | Treatment number | Test Item | Rate of Test Item (g/100 L) | Test sample timing (DALA[1]) | AWRI Sample ID | Total SO$_2$ (mg/L) | Benzoic Acid (mg/kg) |
|---|---|---|---|---|---|---|---|---|---|
| 2 | Grapes | WOB17483-FB010-FB | T1 | Untreated control | Nil | 2 | AE51715 | <3 | <LoD |
| | | WOB17483-FB011-FB | T2 | WOB NP1 | 800 | 0 | AE51716 | 4 | 3.078 |
| | | WOB17483-FB012-FB | T2 | WOB NP1 | 800 | 1 | AE51717 | 4 | 2.150 |
| | | WOB17483-FB013-FB | T2 | WOB NP1 | 800 | 2 | AE51718 | 3 | 1.265 |
| | | WOB17483-FB014-FB | T2 | WOB NP1 | 800 | 3 | AE51719 | 3 | 1.000 |
| | | WOB17483-FB015-FB | T3 | WOB NP1 | 1600 | 0 | AE51720 | 3 | 10.908 |
| | | WOB17483-FB015-FB | T3 | WOB NP1 | 1600 | 0 | AE51720D | 3 | 10.911 |
| | | WOB17483-FB016-FB | T3 | WOB NP1 | 1600 | 1 | AE51721 | <3 | 7.303 |
| | | WOB17483-FB017-FB | T3 | WOB NP1 | 1600 | 2 | AE51722 | <3 | 5.088 |
| | | WOB17483-FB018-FB | T3 | WOB NP1 | 1600 | 3 | AE51723 | <3 | 4.493 |

[1]DALA days after last application
*D denotes duplicate
LoD: limit of detection (0.100 mg/kg)
LoQ: limit of quantitation (0.200 mg/kg)

TABLE 71

The residual benzoic acid and sulfur dioxide remaining in grapes at study site 3

| Site | Sample Type | Specimen sample code | Treatment number | Test Item | Rate of Test Item (g/100 L) | Test sample timing (DALA[1]) | AWRI Sample ID | Total SO$_2$ (mg/L) | Benzoic Acid (mg/kg) |
|---|---|---|---|---|---|---|---|---|---|
| 3 | Grapes | WOB17483-FB001-JF | T1 | Untreated control | Nil | 2 | AE51735 | <3 | <LoD |
| | | WOB17483-FB002-JF | T2 | WOB NP1 | 800 | 0 | AE51738 | <3 | 4.383 |
| | | WOB17483-FB003-JF | T2 | WOB NP1 | 800 | 1 | AE51741 | <3 | 6.330 |
| | | WOB17483-FB004-JF | T2 | WOB NP1 | 800 | 2 | AE51744 | <3 | 3.668 |
| | | WOB17483-FB005-JF | T2 | WOB NP1 | 800 | 3 | AE51747 | <3 | 1.110 |
| | | WOB17483-FB006-JF | T3 | WOB NP1 | 1600 | 0 | AE51750 | <3 | 14.332 |
| | | WOB17483-FB006-JF | T3 | WOB NP1 | 1600 | 0 | AE51750D | <3 | 14.569 |

TABLE 71-continued

The residual benzoic acid and sulfur dioxide remaining in grapes at study site 3

| Site | Sample Type | Specimen sample code | Treatment number | Test Item | Rate of Test Item (g/100 L) | Test sample timing (DALA[1]) | AWRI Sample ID | Total SO$_2$ (mg/L) | Benzoic Acid (mg/kg) |
|---|---|---|---|---|---|---|---|---|---|
| | | WOB17483-FB007-JF | T3 | WOB NP1 | 1600 | 1 | AE51753 | <3 | 11.346 |
| | | WOB17483-FB008-JF | T3 | WOB NP1 | 1600 | 2 | AE51756 | <3 | 7.609 |
| | | WOB17483-FB009-JF | T3 | WOB NP1 | 1600 | 3 | AE51759 | <3 | 5.556 |

[1]DALA days after last application
*D denotes duplicate
LoD: limit of detection (0.100 mg/kg)
LoQ: limit of quantitation (0.200 mg/kg)

TABLE 72

The residual benzoic acid and sulfur dioxide remaining in wine at study site 2

| Site | Specimen sample code | Treatment number | Test Item | Rate of Test Item (g/100 L) | Test sample timing (DALA[1]) | AWRI Sample ID | Wine Total SO$_2$ (mg/L) | Benzoic Acid (mg/L) |
|---|---|---|---|---|---|---|---|---|
| 2 | WOB17483-FB010-JF | T1 | Untreated control | Nil | 2 | AE51762 | <3 | <LoD |
| | WOB17483-FB011-JF | T2 | WOB NP1 | 800 | 0 | AE51765 | 4 | 4.965 |
| | WOB17483-FB012-JF | T2 | WOB NP1 | 800 | 1 | AE51768 | 7 | 7.191 |
| | WOB17483-FB013-JF | T2 | WOB NP1 | 800 | 2 | AE51771 | 5 | 4.187 |
| | WOB17483-FB014-JF | T2 | WOB NP1 | 800 | 3 | AE51774 | 4 | 2.921 |
| | WOB17483-FB015-JF | T3 | WOB NP1 | 1600 | 0 | AE51777 | 4 | 13.797 |
| | WOB17483-FB015-JF | T3 | WOB NP1 | 1600 | 0 | AE51777D | 4 | 13.946 |
| | WOB17483-FB016-JF | T3 | WOB NP1 | 1600 | 1 | AE51780 | <3 | 12.629 |
| | WOB17483-FB017-JF | T3 | WOB NP1 | 1600 | 2 | AE51783 | 4 | 11.357 |
| | WOB17483-FB018-JF | T3 | WOB NP1 | 1600 | 3 | AE51786 | 3 | 8.498 |

[1]DALA days after last application
*D denotes duplicate
LoD: limit of detection (0.100 mg/kg)
LoQ: limit of quantitation (0.200 mg/kg)

TABLE 73

The residual benzoic acid and sulfur dioxide remaining in juice at study site 1

| Site | Specimen sample code | Treatment number | Test Item | Rate of Test Item (g/100 L) | Test sample timing (DALA[1]) | AWRI Sample ID | Juice Total SO$_2$ (mg/L) | Benzoic Acid (mg/L) |
|---|---|---|---|---|---|---|---|---|
| 1 | WOB17483-FB001-JF | T1 | Untreated control | Nil | 2 | AE51733 | <3 | <LOD |
| | WOB17483-FB002-JF | T2 | WOB NP1 | 800 | 0 | AE51736 | <3 | 2.879 |
| | WOB17483-FB003-JF | T2 | WOB NP1 | 800 | 1 | AE51739 | <3 | 2.617 |
| | WOB17483-FB004-JF | T2 | WOB NP1 | 800 | 2 | AE51742 | <3 | 1.235 |
| | WOB17483-FB005-JF | T2 | WOB NP1 | 800 | 3 | AE51745 | <3 | 0.881 |
| | WOB17483-FB006-JF | T3 | WOB NP1 | 1600 | 0 | AE51748 | <3 | 11.109 |
| | WOB17483-FB006-JF | T3 | WOB NP1 | 1600 | 0 | AE51748D | <3 | 11.065 |
| | WOB17483-FB007-JF | T3 | WOB NP1 | 1600 | 1 | AE51751 | <3 | 9.196 |
| | WOB17483-FB008-JF | T3 | WOB NP1 | 1600 | 2 | AE51754 | <3 | 4.949 |
| | WOB17483-FB009-JF | T3 | WOB NP1 | 1600 | 3 | AE51757 | <3 | 4.972 |

[1]DALA days after last application
*D denotes duplicate
LoD: limit of detection (0.100 mg/kg)
LoQ: limit of quantitation (0.200 mg/kg)

TABLE 74

The residual benzoic acid and sulfur dioxide remaining in juice at study site 2

| | | | | Rate of Test Item (g/100 L) | Test sample timing (DALA[1]) | Juice | | |
|---|---|---|---|---|---|---|---|---|
| Site | Specimen sample code | Treatment number | Test Item | | | AWRI Sample ID | Total SO$_2$ (mg/L) | Benzoic Acid (mg/L) |
| 2 | WOB17483-FB010-JF | T1 | Untreated control | Nil | 2 | AE51760 | <3 | <LOD |
|  | WOB17483-FB011-JF | T2 | WOB NP1 | 800 | 0 | AE51763 | <3 | 8.083 |
|  | WOB17483-FB012-JF | T2 | WOB NP1 | 800 | 1 | AE51766 | <3 | 9.928 |
|  | WOB17483-FB013-JF | T2 | WOB NP1 | 800 | 2 | AE51769 | <3 | 4.938 |
|  | WOB17483-FB014-JF | T2 | WOB NP1 | 800 | 3 | AE51772 | <3 | 32.42 |
|  | WOB17483-FB015-JF | T3 | WOB NP1 | 1600 | 0 | AE51775 | <3 | 21.944 |
|  | WOB17483-FB015-JF | T3 | WOB NP1 | 1600 | 0 | AE51775D | <3 | 21.922 |
|  | WOB17483-FB016-JF | T3 | WOB NP1 | 1600 | 1 | AE51778 | <3 | 15.432 |
|  | WOB17483-FB017-JF | T3 | WOB NP1 | 1600 | 2 | AE51781 | <3 | 15.621 |
|  | WOB17483-FB018-JF | T3 | WOB NP1 | 1600 | 3 | AE51764 | <3 | 12.499 |

[1]DALA days after last application

*D denotes duplicate

LoD: limit of detection (0.100 mg/kg)

LoQ: limit of quantitation (0.200 mg/kg)

TABLE 75

The residual benzoic acid and sulfur dioxide remaining in pomace at study site 1

| | | | | Rate of Test Item (g/100 L) | Test sample timing (DALA[1]) | Pomace | | | | |
|---|---|---|---|---|---|---|---|---|---|---|
| Site | Specimen sample code | Treatment number | Test Item | | | AWRI Sample ID | Total SO$_2$ (mg/L) | Moisture content (%) | Benzoic acid 'wet weight' (mg/kg) | Benzoic Acid 'dry weight' (mg/kg) |
| Site 1 | WOB17483-FB001-JF | T1 | Untreated control | Nil | 2 | AE51734 | <3 | 68.33 | <LoD | <LoD |
|  | WOB17483-FB002-JF | T2 | WOB NP1 | 800 | 0 | AE51737 | <3 | 67.79 | 2.553 | 7.924 |
|  | WOB17483-FB003-JF | T2 | WOB NP1 | 800 | 1 | AE51740 | <3 | 68.59 | 1.891 | 8.019 |
|  | WOB17483-FB004-JF | T2 | WOB NP1 | 800 | 2 | AE51743 | <3 | 67.7 | 1.368 | 4.234 |
|  | WOB17483-FB005-JF | T2 | WOB NP1 | 800 | 3 | AE51746 | <3 | 68.13 | 0.788 | 2.474 |
|  | WOB17483-FB006-JF | T3 | WOB NP1 | 1600 | 0 | AE51749 | <3 | 69.80 | 13.821 | 45.770 |
|  | WOB17483-FB006-JF | T3 | WOB NP1 | 1600 | 0 | AE51749D | <3 | 69.80 | 13.502 | 44.713 |
|  | WOB17483-FB007-JF | T3 | WOB NP1 | 1600 | 1 | AE51752 | <3 | 69.68 | 10.304 | 33.981 |
|  | WOB17483-FB008-JF | T3 | WOB NP1 | 1600 | 2 | AE51755 | <3 | 67.54 | 5.056 | 15.579 |
|  | WOB17483-FB009-JF | T3 | WOB NP1 | 1600 | 3 | AE51758 | <3 | 67.79 | 4.693 | 14.588 |

[1]DALA days after last application

*D denotes duplicate

LoD: limit of detection (0.100 mg/kg)

LoQ: limit of quantitation (0.200 mg/kg)

TABLE 76

The residual benzoic acid and sulfur dioxide remaining in pomace at study site 1

| | | | | | | | Pomace | | | |
|---|---|---|---|---|---|---|---|---|---|---|
| Site | Specimen sample code | Treatment number | Test Item | Rate of Test Item (g/100 L) | Test sample timing (DALA[1]) | AWRI Sample ID | Total SO$_2$ (mg/L) | Moisture content (%) | Benzoic acid 'wet weight' (mg/kg) | Benzoic Acid 'dry weight' (mg/kg) |
| Site 2 | WOB17483-FB010-JF | T1 | Untreated control | Nil | 2 | AE51761 | 4 | 65.43 | <LoD | <LoD |
| | WOB17483-FB011-JF | T2 | WOB NP1 | 800 | 0 | AE51764 | 5 | 62.98 | 7.186 | 19.410 |
| | WOB17483-FB012-JF | T2 | WOB NP1 | 800 | 1 | AE51767 | 5 | 61.96 | 9.992 | 26.269 |
| | WOB17483-FB013-JF | T2 | WOB NP1 | 800 | 2 | AE51770 | 4 | 60.22 | 4.795 | 12.052 |
| | WOB17483-FB014-JF | T2 | WOB NP1 | 800 | 3 | AE51773 | 4 | 60.72 | 2.932 | 7.466 |
| | WOB17483-FB015-JF | T3 | WOB NP1 | 1600 | 0 | AE51776 | 4 | 62.91 | 24.133 | 65.074 |
| | WOB17483-FB015-JF | T3 | WOB NP1 | 1600 | 0 | AE51776D | 4 | 62.91 | 24.437 | 65.892 |
| | WOB17483-FB016-JF | T3 | WOB NP1 | 1600 | 1 | AE51779 | 4 | 63.94 | 15.31 | 42.461 |
| | WOB17483-FB017-JF | T3 | WOB NP1 | 1600 | 2 | AE51782 | 3 | 62.29 | 17.683 | 46.894 |
| | WOB17483-FB018-JF | T3 | WOB NP1 | 1600 | 3 | AE51785 | <3 | 65.59 | 4.887 | 14.021 |

[1]DALA days after last application
*D denotes duplicate
LoD: limit of detection (0.100 mg/kg)
LoQ: limit of quantitation (0.200 mg/kg)

Finally, it is to be understood that various alterations, modifications and/or additions may be made without departing from the spirit of the present invention as outlined herein.

The claims defining the invention are as follows:

1. A method for treating crops comprising the steps of:
   producing a dry composition comprising:
      a metabisulphite,
      a benzoate salt, and
      a cellulose additive;
   preparing said dry composition as a formulation; and
   applying the formulation to a crop,
wherein said treatment is for prevention of crops damage by plant pathogens or to reduce bacterial, fungal or human pathogens on said crop; and
   wherein the dry composition comprises the metabisulphite and the benzoate salt blended at a ratio of approximately between 20:80 and 30:70 w/w.

2. A method according to claim 1, wherein the metabisulphite is selected from sodium metabisulphite and potassium metabisulphite and wherein the benzoate salt is selected from sodium benzoate and potassium benzoate; and wherein the benzoate salt and/or metabisulphite is optionally in the form of a powder.

3. A method according to claim 1, wherein the cellulose additive is present at approximately between 0.5% to 3% by weight of the dry composition; and wherein the cellulose additive optionally has a particle size between approximately 20 μm to 2500 μm.

4. A method according to claim 1, wherein the formulation comprises the dry composition being further blended with a surfactant.

5. A method according to claim 4, wherein the surfactant is present at approximately between 0.5% to 10% w/w of the formulation.

6. A method according to claim 4, wherein the surfactant is a non-ionic surfactant selected from the group consisting of polyethylene glycol, polyethylene oxide, dipropylene glycol and polysorbate 80.

7. A method according to claim 1, wherein the formulation is diluted to produce a solution, and wherein the solution has a concentration of approximately between 1 g/L to 8 g/L.

8. A method according to claim 7, wherein the solution has a pH of between approximately 2.0 and 7.5.

9. A method according to claim 7, wherein the solution is applied to the crop as either a pre-harvest spray or a post-harvest wash.

10. A method according to claim 1, wherein the crop treated is selected from fruits, vegetables, grains, grasses and seeds.

11. A method according to claim 10, wherein the formulation is further applied to a grape crop upon expression of *Botrytis* and at any combination of the following stages of grape maturation:
   approximately 10% flower drop;
   approximately 30% cap fall;
   approximately end of flowering;
   approximately berry size approximately 4 mm;
   approximately bunch closure; and
   approximately veraison;
   or wherein the formulation is applied to the crop upon expression of pathogens or at any combination of the following stages of crop maturation:
   bud-swell;
   20% to 30% bloom and early petal-fall stages;

one month to harvest; and two weeks to harvest.

12. A method according to claim 1, wherein the formulation is applied at no later than 3 days prior to harvest, and wherein the crop is further treated post harvest, wherein the post harvest treatment is a solution of the formulation having a concentration approximately between 1 g/L and 8 g/L.

13. A method according to claim 1, wherein the crop is treated post harvest, wherein the post harvest treatment is a solution of the formulation having a concentration approximately between 1 g/L and 8 g/L.

14. A method according to claim 1, wherein the applied formulation results in reducing growth of crop pathogens selected from the group consisting of *Botrytis cinerea, Xanthomonas* spp, *E. coli, Monilina fructicola, Penicillium* spp. and *Erwinia Carotovora*.

15. A method according to claim 14, wherein the applied formulation results in approximately between 10% to 30% reduction in *Botrytis cinerea* growth compared to an untreated crop; or wherein the applied formulation results in approximately greater than 50% reduction in *Xanthomonas* spp growth compared to an untreated crop; or wherein the applied formulation results in approximately greater than 60% reduction in growth of *E. coli* compared to an untreated crop.

16. A method according to claim 1, wherein the applied formulation results in substantially no effect on the growth rate of *Saccharomyces cerevisae* and/or *Schizosaccharomyces pombe* species.

17. A method for treating crops comprising the steps of:
providing a dry composition comprising:
   a metabisulphite,
   a benzoate salt, and
   a cellulose additive;
preparing said dry composition as a formulation;
applying the formulation to the crop, and
applying a further fungicide to the crop;
wherein said treatment is for prevention or reduction of crop damage by plant pathogens or to reduce bacterial, fungal or human pathogens on said crop; and
   wherein the dry composition comprises the metabisulphite and the benzoate salt blended at a ratio of approximately between 20:80 and 30:70 w/w.

18. A method according to claim 17, wherein the fungicide contains a halogen based active ingredient, wherein the halogen based fungicide includes an active ingredient selected from 1-Bromo-3-chloro-5,5-dimethylhydantoin (BCDMH), chlorine, bromine, an active ingredient which releases a halogen, an active ingredient which releases hypobromous acid and/or hypochlorous acid, an active ingredient which releases chlorine and/or bromine, or any suitable combination thereof.

19. A method according to claim 17, wherein the formulation is diluted to produce a solution prior to applying the formulation to a crop, and wherein the solution has a concentration of approximately between 1 g/L to 8 g/L.

20. A method according to claim 17, wherein the method results in reducing growth of crop pathogens selected from the group consisting of *Botrytis cinerea, Xanthomonas* spp, *E. coli, Monilina fructicola* and *Penicillium* spp.

21. A method according to claim 17, wherein the crop is treated with both the formulation and fungicide pre harvest, and further treated with the formulation post harvest; alternatively wherein the crop is treated with both the formulation and fungicide post harvest, and further treated with the formulation pre harvest.

22. A method according to claim 17, wherein the applied fungicide contains a halogen based active ingredient at a concentration of between 1 to 100 ppm.

23. A method according to claim 17, wherein the fungicide is applied sequentially before the formulation.

* * * * *